United States Patent
Hikawa et al.

(10) Patent No.: US 7,392,158 B2
(45) Date of Patent: Jun. 24, 2008

(54) DRIVE UNIT FOR COMPRESSOR AND REFRIGERATOR

(75) Inventors: Takeshi Hikawa, Sakai (JP); Toshiyuki Maeda, Kusatsu (JP); Shinichi Kasahara, Sakai (JP); Takahiro Yamaguchi, Sakai (JP); Shigenobu Izumi, Kusatsu (JP); Kiyoshi Koizumi, Sakai (JP); Masanobu Kita, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 509 days.

(21) Appl. No.: 10/521,942

(22) PCT Filed: Jul. 24, 2003

(86) PCT No.: PCT/JP03/09415

§ 371 (c)(1),
(2), (4) Date: Jan. 21, 2005

(87) PCT Pub. No.: WO2004/011807

PCT Pub. Date: Feb. 5, 2004

(65) Prior Publication Data

US 2005/0247073 A1    Nov. 10, 2005

(30) Foreign Application Priority Data

Jul. 25, 2002   (JP) ............................ 2002-216025
Dec. 19, 2002   (JP) ............................ 2002-367841

(51) Int. Cl.
*G01L 3/00*    (2006.01)
*G06F 19/00*   (2006.01)
*G06F 11/30*   (2006.01)

(52) U.S. Cl. ..................... 702/185; 702/41; 702/50; 702/99; 702/130; 62/125; 318/490

(58) Field of Classification Search .................. 702/33, 702/50, 99

See application file for complete search history.

(56) References Cited

U.S. PATENT DOCUMENTS

| | | | | | |
|---|---|---|---|---|---|
| 4,596,123 | A | * | 6/1986 | Cooperman | 62/199 |
| 4,616,179 | A | * | 10/1986 | Braun | 324/772 |
| 5,056,032 | A | * | 10/1991 | Swanson et al. | 700/292 |
| 5,512,883 | A | * | 4/1996 | Lane, Jr. | 340/648 |
| 5,712,551 | A | * | 1/1998 | Lee | 318/466 |
| 5,754,450 | A | * | 5/1998 | Solomon et al. | 702/35 |
| 5,924,296 | A | | 7/1999 | Takano et al. | |
| 6,283,631 | B1 | * | 9/2001 | Gousset et al. | 374/152 |
| 2002/0128730 | A1 | | 9/2002 | Shimada et al. | |
| 2002/0170305 | A1 | * | 11/2002 | Nakajima | 62/228.4 |
| 2002/0184899 | A1 | | 12/2002 | Togaru et al. | |
| 2003/0001536 | A1 | * | 1/2003 | Kitajima | 318/629 |

FOREIGN PATENT DOCUMENTS

| | | | |
|---|---|---|---|
| JP | 7-180933 A | | 7/1995 |
| JP | 2001-99070 A | | 4/2001 |
| JP | 2001-186800 A | | 7/2001 |
| JP | 2001-280258 A | | 10/2001 |
| JP | 2001-333589 A | | 11/2001 |
| JP | 2001-138966 | * | 5/2002 |
| JP | 2002-136172 A | | 5/2002 |
| JP | 2002-138966 A | | 5/2002 |

* cited by examiner

*Primary Examiner*—Manuel L. Barbee
(74) *Attorney, Agent, or Firm*—Global IP Counselors

(57) ABSTRACT

An instantaneous current and instantaneous voltage of a three-phase coil of a brushless DC motor are detected, and the internal condition of a compressor is predicted from these detection values. The prediction about the internal condition of the compressor is made in such a way that motor driving torque which is a parameter of a motor model is identified and poor lubrication, liquid compression or the like is predicted from this identified motor driving torque. This enables it to make, in real time, a failure forecast, failure diagnosis etc. on the compressor.

6 Claims, 12 Drawing Sheets

US 7,392,158 B2

DRIVE UNIT FOR COMPRESSOR AND REFRIGERATOR

CROSS-REFERENCE TO RELATED APPLICATIONS

This nonprovisional application claims priority under 35 U.S.C. §119(a) to Japanese Patent Application No. 2002-216025, filed in Japan on Jul. 25, 2002, and Japanese Patent Application No. 2002-367841, filed in Japan on Dec. 19, 2002, the entire contents of which are hereby incorporated by reference.

TECHNICAL FIELD

The present invention relates to a drive unit for a compressor and a refrigerator.

BACKGROUND ART

Generally, refrigerant circuits for use in an air conditioner are constituted by a compressor, an outdoor heat exchanger, an expansion valve and an indoor heat exchanger which are all connected in series to perform operation on the vapor-compression refrigerating cycle. In such refrigerant circuits, operation is sometimes performed in inadequate conditions owing to acceleration/deceleration of the compressor, abrupt fluctuations in load, and defective operation of other apparatus than the compressor. If this happens, the compressor gets internal damage, resulting in a failure in the compressor.

To cope with this, the conventional refrigerant circuits of this type are designed to prevent liquid compression and the dilution of the lubricating oil, for example, by controlling the degree of superheating a suction refrigerant (hereinafter referred to as "the degree of suction superheat) in the suction pipe of the compressor.

The above refrigerant circuits control the temperature of the discharge pipe of the compressor so as to become equal to a temperature which is determined by making a comparison between the saturation temperature of the low-pressure refrigerant and the temperature of the discharge gas of the compressor, whereby degradation of oil inside the compressor as well as degradation of the magnets is avoided.

Concretely, Japanese Patent Publication Kokai No. 7-180933 discloses a refrigerator according to which, the temperature of the oil of the compressor and the pressure of the suction refrigerant of the compressor are detected and, according to the detection result, the solubility of the refrigerant dissolved in the oil is calculated. And, based on the solubility of the refrigerant, the operation frequency of the compressor is controlled, thereby preventing the dilution of the oil.

Also, Japanese Patent Publication Kokai No. 2001-99070 discloses a compressor having ultrasonic probes at the lubrication points thereof. Based on ultrasonic intensities detected by the ultrasonic probes, it is determined whether or not poor lubrication occurs.

PROBLEMS TO BE SOLVED

The refrigerator of Japanese Patent Publication Kokai No. 7-180933, however, does not directly detect phenomena appearing within the compressor, so that time delay, detection errors, etc. are included in the control. When designing a refrigerator, safety is taken into consideration which often leads to excessive protection of the compressor and others. As a result, satisfactory performance on the refrigerating cycle cannot be achieved.

As noted earlier, the refrigerator of Japanese Patent Publication Kokai No. 2001-99070 needs provision of ultrasonic probes, which causes the drawback that the number of parts increases and the compressor becomes complex in structure.

The invention is directed to overcoming the shortcomings of the prior art and a primary object of the invention is, therefore, to enable accurate prediction of the internal condition of a compressor, to prevent accidents caused by abnormal operation of the compressor, and to avoid excessive protection of the compressor etc., thereby maintaining a high-efficiency operating condition.

SUMMARY OF THE INVENTION

First of all, a first invention is associated with a drive unit for a compressor having a motor 6. The drive unit includes detecting means 16 and 17 for detecting the current and/or voltage of the motor 6. The drive unit further includes prediction means 28 for predicting an internal condition based on detection values obtained by these detecting means 16 and 17.

In the first invention, the current and/or voltage of the motor 6 are detected in a motor drive circuit (e.g., inverter circuit). Based on this electrical information, the internal condition of the compressor 1 is predicted. Thanks to this arrangement, the current and/or voltage can be detected by real-time processing without time delay, so that the internal condition of the compressor 1 is predicted with high accuracy within a short time.

In a second invention, there is provided a drive unit according to the first invention, wherein the prediction means 28 has identification means 20 for identifying a parameter of a motor model from the detection values obtained by the detecting means 16 and 17, and derivation means 21 for deriving the internal condition based on the parameter identified by the identification means 20.

According to the second invention, the identification means 20 identifies a parameter of a motor model from the detection values obtained by the detecting means 16 and 17. Based on the parameter identified by the identification means 20, the derivation means 21 derives the internal condition.

In a third invention, there is provided a drive unit according to the first invention, wherein the internal condition predicted by the prediction means 28 is shaft abnormalities or poor lubrication.

According to the third invention, occurrence of shaft abnormalities or poor lubrication is predictable. This enables it to make a change into a more relaxed service condition to avoid severe damage.

In a fourth invention, there is provided a drive unit according to the first invention, wherein the internal condition predicted by the prediction means 28 is motor temperature.

According to the fourth invention, since motor temperature is predicted, a need for a temperature detection sensor can be obviated. Further, it is possible to determine whether the motor is driving normally from, for example, this predicted motor temperature.

In a fifth invention, there is provided a drive unit according to the first invention, wherein the motor 6 is a brushless DC motor.

Since the fifth invention uses a brushless DC motor, the internal condition can be more accurately predicted.

Sixth to thirty-eighth inventions are associated with refrigerators equipped with the drive unit for a compressor constructed according to the first invention. First, there is provided a refrigerator according to a sixth invention, which has a refrigerant circuit provided with a compressor 1 including a motor 6. Also, the refrigerator has detecting means 16 and 17 for detecting the current and/or voltage of the motor 6, and prediction means 28 for predicting the internal condition of the compressor 1 based on detection values obtained by the detecting means 16 and 17.

According to the sixth invention, the current and/or voltage of the motor 6 are detected in a motor drive circuit (e.g., inverter circuit). Based on this electrical information, the internal condition of the compressor 1 is predicted. Thanks to this arrangement, the current and/or voltage can be detected by real-time processing without time delay, so that the internal condition of the compressor 1 is predicted with high accuracy within a short time and refrigeration is performed.

In a seventh invention, there is provided a refrigerator according to the sixth invention, wherein the prediction means 28 has identification means 20 for identifying a parameter of a motor model from the detection values obtained by the detecting means 16 and 17, and derivation means 21 for deriving the internal condition of the compressor 1 based on the parameter identified by the identification means 20.

According to the seventh invention, the identification means 20 identifies a parameter of a motor model from the detection values obtained by the detecting means 16 and 17. Based on the parameter identified by the identification means 20, the derivation means 21 derives the internal condition.

In an eighth invention, there is provided a refrigerator according to the sixth invention, wherein the motor 6 is a brushless DC motor.

In a ninth invention, there is provided a refrigerator according to the seventh invention, wherein the parameter identified by the identification means 20 is motor driving torque.

According to the ninth invention, since motor driving torque is identified, refrigerant pressure etc. in the refrigerant circuit can be estimated from this motor driving torque.

In a tenth invention, there is provided a refrigerator according to the sixth invention, wherein the internal condition predicted by the prediction means 28 is the high refrigerant pressure or low refrigerant pressure of the refrigerant circuit.

According to the tenth invention, since the high refrigerant pressure or the like of the refrigerant circuit is estimated, the operating condition of the refrigerant circuit can be grasped from this high pressure or the like.

In an eleventh invention, there is provided a refrigerator according to the ninth invention, wherein the refrigerant circuit is provided with refrigerant detecting means 22 and 23 for detecting a refrigerant state. The derivation means 21 derives the high refrigerant pressure or low refrigerant pressure of the refrigerant circuit based on the motor driving torque identified by the identification means 20 and the refrigerant state detected by the refrigerant detecting means 22 and 23.

According to the eleventh invention, since the high refrigerant pressure or the like of the refrigerant circuit is estimated based on the motor driving torque and the refrigerant state of the refrigerant circuit, the reliability of the estimated high refrigerant pressure is high.

In a twelfth invention, there is provided a refrigerator according to the ninth invention, wherein the refrigerant circuit is provided with refrigerant detecting means 22 and 23 for detecting a refrigerant state. The derivation means 21 is formed such that the relationship between motor driving torque corresponding to the refrigerant temperature and/or refrigerant pressure of the refrigerant circuit and the degree of suction superheat of the compressor 1 is set beforehand, and such that the degree of suction superheat of the compressor 1 is derived based on the motor driving torque identified by the identification means and the refrigerant state detected by the refrigerant detecting means 22 and 23.

According to the twelfth invention, since the degree of suction superheat of the compressor 1 is estimated, the degree of suction superheat can be properly adjusted, so that excessively overheating operation and wet operation can be avoided.

In a thirteenth invention, there is provided a refrigerator according to the sixth invention, wherein the internal condition predicted by the prediction means 28 is occurrence of an impact load within the compressor 1.

According to the thirteenth invention, it is predictable that an impact load such as shaft abnormalities or liquid compression has been imposed. This enables it to make a change into a more relaxed service condition, for example, by reducing the operation frequency of the compressor 1, thereby avoiding severe damage.

In a fourteenth invention, there is provided a refrigerator according to the thirteenth invention, wherein the detection value obtained by the detecting means 16 is the current of the motor 6, and the prediction means 28 predicts occurrence of an impact load from the higher harmonic component of the detection current obtained by the detecting means 16.

According to the fourteenth invention, the higher harmonic component of the detection current is analyzed and if an abnormality occurs in this higher harmonic component (the fundamental wave component of a current wave form), it is then predicted that an impact load such as shaft abnormalities or liquid compression has been imposed.

In a fifteenth invention, there is provided a refrigerator according to the fourteenth invention, wherein the prediction means 28 predicts occurrence of an impact load from the amount of distortion in the sine wave of the higher harmonic component of the detection current.

According to the fifteenth invention, since the higher harmonic component of the detection current is analyzed and the impact load imposed on the compressor 1 is predicted from the amount of distortion of the sine wave, the internal condition (such as poor lubrication or liquid compression) of the compressor 1 can be stably predicted.

In a sixteenth invention, there is provided a refrigerator according to the fourteenth invention, wherein the prediction means 28 predicts occurrence of an impact load when the higher harmonic component of the detection current is greater than a preset reference value.

According to the sixteenth invention, since the internal condition of the compressor 1 is predicted by making a comparison between the higher harmonic component of the detection current and its reference value, the internal condition (such as poor lubrication or liquid compression) of the compressor 1 can be easily predicted.

In a seventeenth invention, there is provided a refrigerator according to the sixteenth invention, wherein the reference value for the prediction means 28 is set in accordance with the refrigerant temperature and/or refrigerant pressure of the refrigerant circuit.

According to the seventeenth invention, since the specified reference value is set according to the refrigerant temperature or the like of the refrigerant circuit, the reliability of the predicted internal condition increases.

In an eighteenth invention, there is provided a refrigerator according to the sixth invention, wherein the internal condition predicted by the prediction means 28 is poor lubrication or liquid compression in the compressor 1.

According to the eighteenth invention, occurrence of poor lubrication or liquid compression is predictable and, if poor lubrication or liquid compression is predicted, there is then made a change into a more relaxed service condition to avoid severe damage.

In a nineteenth invention, there is provided a refrigerator according to the eighteenth invention, wherein the detection value obtained by the detecting means 16 is the current of the motor 6, and the prediction means 28 predicts the poor lubrication or liquid compression of the compressor 1, based on the increasing rate of the detection current obtained by the detecting means 16.

According to the nineteenth invention, since poor lubrication or liquid compression will occur if there is a rapid rise in current, the internal condition of the compressor 1 such as poor lubrication can be predicted from this rise.

In a twentieth invention, there is provided a refrigerator according to the nineteenth invention, wherein the refrigerant circuit is equipped with refrigerant detecting means 22 and 23 for detecting a refrigerant state. In the prediction means 28, a stationary current for the motor 6 in its steady state is set based on the detection current obtained by the detecting means 16 and based on the refrigerant state detected by the refrigerant detecting means 22 and 23, and the poor lubrication or liquid compression of the compressor 1 is predicted by making a comparison between the stationary current and the detection current obtained by the detecting means 16.

According to the twentieth invention, since stationary current is set based on the detection current and the refrigerant temperature, refrigerant pressure or the like of the refrigerant circuit, the stationary current thus set has high reliability. Based on the comparison between the stationary current and the detection current, the internal condition of the compressor 1 is predicted. As a result, the internal condition of the compressor 1 such as poor lubrication is predicted with high accuracy.

In a twenty-first invention, there is provided a refrigerator according to the ninth invention, wherein the prediction means 28 predicts poor lubrication or liquid compression in the compressor 1 based on an increase in motor driving torque which exceeds a specified value.

According to the twenty-first invention, since poor lubrication and liquid compression will occur if there is a big rise in motor driving torque exceeding a specified value, the internal condition of the compressor 1 such as poor lubrication can be predicted from the rise.

In a twenty-second invention, there is provided a refrigerator according to the twenty-first invention, wherein the refrigerant circuit is equipped with refrigerant detecting means 22 and 23 for detecting a refrigerant state. In the prediction means 28, a stationary torque for the motor 6 in its steady state is set based on the motor driving torque identified by the identification means 20 and based on the refrigerant state detected by the refrigerant detecting means 22 and 23, and the poor lubrication or liquid compression of the compressor 1 is predicted by making a comparison between the stationary torque and the motor driving torque identified by the identification means 20.

According to the twenty-second invention, since stationary torque is set based on the motor driving torque and the refrigerant temperature, refrigerant pressure or the like of the refrigerant circuit, the stationary torque thus set has high reliability. Based on the comparison between the stationary torque and the identified torque, the internal condition of the compressor 1 is predicted. As a result, the internal condition of the compressor 1 such as poor lubrication is predicted with high accuracy.

In a twenty-third invention, there is provided a refrigerator according to the ninth invention, wherein the prediction means 28 outputs information on the internal condition of the compressor 1 which has been predicted.

According to the twenty-third invention, since information such as predicted refrigerant temperature, refrigerant pressure, or the lubrication state of the shaft is outputted, the user or the like can grasp the internal condition of the compressor 1 without fail.

In a twenty-fourth invention, there is provided a refrigerator according to the ninth invention, which has protection means 29 for protecting the compressor 1 based on information on the internal condition of the compressor 1 predicted by the prediction means 28. It should be noted that "the protection of the compressor" expressed herein means that the compressor is prevented from abnormal operation, based on the information predicted or detected.

According to the twenty-fourth invention, the compressor 1 is protected by the protection means 29.

In a twenty-fifth invention, there is provided a refrigerator according to the twenty-fourth invention, wherein the protection means 29 controls inverter controlling means 26 for driving the compressor 1 to perform a protective operation of the compressor 1.

According to the twenty-fifth invention, the internal condition of the compressor 1 is predicted from the current of the motor 6 or the like, and the inverter controlling means 26 is controlled based on this internal condition. As a result, the protective operation of the compressor 1 is performed.

In a twenty-sixth invention, there is provided a refrigerator according to the twenty-fifth invention, wherein the protection means 29 controls the inverter controlling means 26 to perform the protective operation of the compressor 1 in preference to operation control of the refrigerant circuit.

According to the twenty-sixth invention, since the protective operation of the compressor 1 is performed in preference to an instruction given to start the operation control of the refrigerant circuit, the compressor 1 can be steadily protected.

In a twenty-seventh invention, there is provided a refrigerator according to the twenty-fourth invention, which has switching means for switching from the protective operation of the protection means 29 to a steady operation, based on the information on the internal condition of the compressor 1 which has been predicted by the prediction means 28.

According to the twenty-seventh invention, since the refrigerator includes the switching means for switching the protective operation of the compressor 1 to the steady operation, recovery of the steady operation can be done only when it is determined based on the prediction of the internal condition of the compressor 1 that no abnormal operations will be caused by recovery of the steady operation.

In a twenty-eighth invention, there is provided a refrigerator according to the twenty-fourth invention, wherein the protection means 29 makes a failure diagnosis on the compressor 1. It should be noted that the term "failure diagnosis" used herein means that the compressor is diagnosed as having poor lubrication from current distortion, or as having liquid compression from a change in current, or as having abnormalities in high pressure or low pressure based on estimation of refrigerant pressure.

According to the twenty-eighth invention, since a failure diagnosis is made based on the predicted internal condition, not only the reliability of the failure diagnosis is high, but also it is possible to point the location of failure and to predict the cause of failure.

In a twenty-ninth invention, there is provided a refrigerator according to the twenty-eighth invention, which has memory means 21 for memorizing the result of the diagnosis made by the protection means 29.

According to the twenty-ninth invention, since the result of the failure diagnosis is stored in the memory means 21, faults can be corrected by utilizing the result of the failure diagnosis after, for instance, stopping of the operation.

In a thirtieth invention, there is provided a refrigerator according to the twenty-fourth invention, wherein the protection means 29 is so formed as to forecast a failure in the compressor 1. It should be noted that the term "failure forecast" used herein means that poor lubrication is predicted from current distortion, liquid compression is predicted from a change in current, or abnormalities in high pressure or low pressure are predicted from estimation of refrigerant pressure.

According to the thirtieth invention, since the failure forecast is made based on the predicted internal condition, not only the reliability of the failure forecast is high, but also an abnormal operation which leads to a failure can be avoided based on this failure forecast.

In a thirty-first invention, there is provided a refrigerator according to the thirtieth invention, which has communication means 31 for outputting information on the forecast made by the protection means 29.

According to the thirty-first invention, since information on the failure forecast can be sent to the outside, it is possible to inform the user or the like of the failure forecast so that an operation which leads to a failure can be avoided.

In a thirty-second invention, there is provided a refrigerator according to the twenty-fourth invention, wherein the protection means 29 is so formed as to alter the control content or control parameter of the refrigerant circuit.

According to the thirty-second invention, since the control content or control parameter of the refrigerant circuit is changed based on the predicted internal condition, high-efficiency operation can be achieved.

In a thirty-third invention, there is provided a refrigerator according to the sixth invention, wherein a refrigerant system model for the refrigerant circuit is provided beforehand and the operating condition of the refrigerant circuit is predicted based on information on the internal condition of the compressor 1 predicted by the prediction means 28.

According to the thirty-third invention, since a refrigerant system model is used and the operating condition of the refrigerant circuit is predicted based on the predicted internal condition, the prediction of the internal condition is carried out with high responsibility.

In a thirty-fourth invention, there is provided a refrigerator according to the seventh invention, wherein the motor 6 is a brushless DC motor, and wherein the prediction means 28 predicts motor temperature from the current and voltage of the motor 6 and instrument constants.

According to the thirty-fourth invention, since motor temperature is predicted from the current and voltage of the motor 6 and instrument constants, use of a temperature detection sensor becomes unnecessary. If the rotating position of a rotor 1a is predicted in this arrangement, motor temperature can be estimated without additional use of other arrangements.

In a thirty-fifth invention, there is provided a refrigerator according to the seventh invention, wherein the motor 6 is a brushless DC motor, and wherein the identification means 20 identifies a parameter based on a motor model constituted by the current and voltage of the motor 6, resistance, and inductance. Further, the derivation means 21 derives motor temperature based on the parameter identified by the identification means 20.

According to the thirty-fifth invention, since a motor model is used, the temperature of the magnets 1b can be estimated through easy arithmetic operation. The temperature of the magnets 1b is used in place of motor temperature.

In a thirty-sixth invention, there is provided a refrigerator according to the thirty-fifth invention, wherein the identification means 20 obtains a motor voltage equation in such a way that a d-axis is plotted in the direction of the N pole of magnets 1b of the motor 6, a q-axis is plotted in the direction which is shifted forward from the d-axis by $\pi/2$, and a basic voltage equation for a three-phase PMSM is converted into a d, q axis coordinate system which rotates at an electric angular speed $\omega$, and the identification means 20 then identifies a magnetic flux characteristic value associated with an armature flux linkage generated by the magnets 1b, using this motor voltage equation. Further, the derivation means 21 derives the temperature of the magnets 1b as motor temperature based on the magnetic flux characteristic value identified by the identification means 20.

According to the thirty-sixth invention, motor temperature can be reliably estimated utilizing a simple basic arithmetic expression without use of a temperature sensor.

In a thirty-seventh invention, there is provided a refrigerator according to the thirty-sixth invention, wherein the identification means 20 obtains a voltage equation for a steady state from the motor voltage equation, and at the time of the identification, the d-axis component of the armature current of the steady-state voltage equation is set to zero.

According to the thirty-seventh invention, since the voltage equation for the motor 6 in its steady state is obtained and at the time of the prediction, the d-axis component of the armature current is set to zero in this voltage equation, the number of operation elements as well as operation errors can be reduced.

In a thirty-eighth invention, there is provided a refrigerator according to the thirty-fifth invention, wherein the refrigerant circuit has refrigerant detecting means 24 for detecting the temperature of a discharge pipe of the compressor 1. The refrigerator further comprises calibration means 36 which is configured such that, the motor temperature derived by the derivation means 21 being regarded as the internal temperature of the compressor 1, the internal temperature derived by the derivation means 21 is calibrated based on the discharge pipe temperature detected by the temperature detecting means 24.

According to the thirty-eighth invention, since the internal temperature is calibrated, the reliability of the estimated temperature increases. The actual temperature used for this calibration is the discharge pipe temperature of the compressor 1. This discharge pipe temperature is used when performing discharge pipe temperature control of the refrigerant circuit, and a temperature sensor for detecting the discharge pipe temperature is usually provided for the refrigerant circuit. Therefore, there is no need to use an additional temperature sensor for the calibration described above.

Effect of Invention

According to the invention, the internal condition of the compressor 1 can be predicted with high accuracy by real-time processing without time delay. This makes it possible to notify occurrence of a failure beforehand by detecting from the internal condition that an internal property has changed with time and to determine the location of a fault and predict the cause of the fault based on the change of the property from its initial state. More specifically, a failure forecast or failure diagnosis can be accurately made in real time by predicting the internal condition of the compressor 1, so that destruction due to abnormal operation of the compressor 1 can be prevented and the reliability of the compressor 1 can be increased.

According to the second invention, since a parameter of a motor model is identified and the internal condition is derived based on this identified parameter, the internal condition can be more correctly predicted. As a result, reliable avoidance of abnormal operation etc. can be achieved.

According to the third invention, since shaft abnormalities and poor lubrication are predictable, it is possible to make a change into a more relaxed service condition, for example, by reducing operating frequency when troubles occur. As a result, severe damage can be avoided.

According to the fourth invention, since motor temperature is estimated, it is unnecessary to use a temperature detection sensor. In addition, if data for estimating a rotating position are used, additional use of other components becomes unnecessary. This enables it to obtain motor temperature at low cost. From this predicted motor temperature, it is possible to determine, for example, whether the motor is operating normally. Since there is the possibility that a motor failure will occur if the motor is in abnormal operation, the operation is stopped before occurrence of a failure thereby avoiding troubles.

According to the fifth invention, a brushless DC motor is used, which increases the accuracy of the prediction of the internal condition.

According to the sixth invention, the internal condition of the compressor 1 can be predicted with high accuracy, so that superfluous design can be avoided and the refrigerant circuit can exert satisfactory performance.

According to the seventh invention, a parameter of a motor model is identified and the internal condition is derived based on this identified parameter, so that the internal condition of the compressor 1 can be more correctly predicted. As a result, abnormal operation of the refrigerant circuit etc. can be reliably avoided.

According to the eighth invention, a brushless DC motor is used, so that the internal condition can be more accurately predicted.

According to the ninth invention, since motor driving torque is estimated, the refrigerant pressure etc. of the refrigerant circuit can be predicted from this motor driving torque. This makes it possible to prevent the compressor 1 from operating abnormally.

According to the tenth invention, since the high refrigerant pressure etc. of the refrigerant circuit is estimated, the operating condition of the refrigerant circuit can be grasped from this refrigerant pressure. As a result, operation with pressure abnormalities can be avoided, which prevents a failure in the compressor 1 without fail.

According to the eleventh invention, since the reliability of the estimated refrigerant pressure is high, operation in an abnormal condition and therefore a failure in the compressor 1 can be avoided without fail.

According to the twelfth invention, the degree of suction superheat of the compressor 1 can be estimated. In the event that the degree of suction superheat is inadequate, it can be properly adjusted so that excessive overheating and excessive wet operation can be avoided.

According to the thirteenth invention, it is predictable that an impact load such as shaft abnormalities or liquid compression has been imposed. Therefore, if such an impact load is predicted, the operating frequency of the compressor 1, for instance, will be reduced. As a result, operation is shifted into a more relaxed service condition, thereby avoiding severe damage.

According to the fourteenth invention, shaft abnormalities and liquid compression can be steadily predicted from the high frequency component of current. This makes it possible to avoid operation in an impact-load-imposed condition, thereby preventing a failure in the compressor 1 etc.

According to the fifteenth invention, shaft abnormalities and liquid compression can be steadily predicted from the distortion amount of the high frequency component of current. This makes it possible to prevent abnormal operation and, therefore, a failure in the compressor 1 etc. without fail.

According to the sixteenth invention, since occurrence of an impact load is predicted from a rise in the high frequency component of current, easy and accurate prediction of the internal condition of the compressor 1 becomes possible. With this arrangement, abnormal operation and therefore a failure in the compressor 1 etc. can be prevented without fail.

According to the seventeenth invention, since a reference value is set in accordance with the state of the refrigerant, the reliability of the predicted internal condition can be increased. This makes it possible to prevent a failure in the compressor 1 etc. without fail.

According to the eighteenth invention, poor lubrication and liquid compression are predictable, and if poor lubrication or liquid compression is predicted, the operation frequency of the compressor 1, for example, can be reduced. As a result, operation can be shifted into a more relaxed service condition, thereby avoiding severe damage.

According to the nineteenth invention, since occurrence of poor lubrication or liquid compression is predictable from a rise in current, abnormal operation and therefore a failure in the compressor 1 etc. can be avoided without fail.

According to the twentieth invention, since a comparison between the stationary current and detection current of the motor 6 is made, accurate prediction of the internal condition of the compressor 1 such as poor lubrication becomes possible. With this arrangement, abnormal operation and therefore a failure in the compressor 1 etc. can be prevented without fail.

According to the twenty-first invention, since the internal condition of the compressor 1 such as poor lubrication is predictable from a rise in motor driving torque, abnormal operation and, in consequence, a failure in the compressor 1 etc. can be avoided without fail.

According to the twenty-second invention, since the stationary torque of the motor 6 is compared with the identified motor driving torque, accurate prediction of the internal condition of the compressor 1 such as poor lubrication becomes possible. With this arrangement, abnormal operation and therefore a failure in the compressor 1 etc. can be prevented without fail.

According to the twenty-third invention, since information on the internal condition of the compressor 1 is output, the user or the like can correctly grasp the internal condition.

According to the twenty-fourth invention, since the protective operation of the compressor 1 is carried out, a failure in the compressor 1 can be prevented, thereby achieving improved durability.

According to the twenty-fifth invention, since the protective operation is carried out by varying inverter control, a failure in the compressor 1 etc. can be prevented without fail.

According to the twenty-sixth invention, since the compressor 1 is protected in preference to the control of the refrigerant circuit, improved durability can be achieved so that stable operation can be performed over the long period of time.

According to the twenty-seventh invention, the compressor 1 can return to the steady operation only when no abnormal operation is caused by recovery of the steady operation. With this arrangement, as long as the predicted internal condition is normal, normal operation can be carried out so that high-efficiency air conditioning can be achieved.

According to the twenty-eighth invention, since a failure diagnosis can be made, the location and cause of a fault become predictable. This makes it possible to correct the fault and remove the cause of the fault thereafter, so that operation in a failed state can be avoided.

According to the twenty-ninth invention, since the result of the failure diagnosis can be stored, fault correction etc. can be made by use of the result of the diagnosis, for example, after the operation is stopped.

According to the thirtieth invention, since a failure forecast is made, abnormal operation entailing a failure can be avoided based on the failure forecast.

According to the thirty-first invention, since forecast information is output, the user or the like can be notified of the failure forecast so that operation entailing a failure can be avoided.

According to the thirty-second invention, since the contents of control etc. are changed, high-efficiency operation can be performed which leads to a reduction in the running cost.

According to the thirty-third invention, since the operating condition of the refrigerant circuit is predicted, abnormal operation and therefore a failure in the compressor 1 can be avoided without fail.

According to the thirty-fourth invention, since motor temperature can be estimated, there is no need to use a temperature detection sensor for the refrigerant circuit. In addition, in cases where data for predicting the rotating position of the motor 6 is used, a need to additional use of other components can be obviated. This makes it possible to obtain motor temperature at low cost. Further, once motor temperature is estimated, it becomes possible to determine from the estimated motor temperature whether the motor functions normally. If an abnormality is found, the operation is then stopped before the motor malfunctions, so that a failure can be avoided.

According to the thirty-fifth invention, the temperature of the magnets 1b can be estimated through simple arithmetic operation. The temperature of the magnets 1b can be used as motor temperature. Therefore, the predicted motor temperature has high reliability.

According to the thirty-sixth invention, motor temperature can be reliably estimated not by using a temperature sensor, but by utilizing a simple basic arithmetic expression.

According to the thirty-seventh invention, since a motor voltage equation for the steady state is obtained and the d-component of armature current in the motor voltage equation is set to zero at the time of the prediction, the number of operation elements as well as operation errors can be reduced. This enables high accuracy temperature estimation.

According to the thirty-eighth invention, since the estimated temperature is calibrated, improved reliability can be assured. This prevents the compressor 1 from being judged to be abnormal when it is operating in its normal state and, conversely, judged to be normal when it is operating in its abnormal state.

Additionally, the actual temperature used for the calibration is the temperature of the discharge pipe of the compressor 1. This discharge pipe temperature is used when performing discharge pipe temperature control of the refrigerant circuit, and the refrigerant circuit is equipped with a temperature sensor for detecting the temperature of the discharge pipe. Therefore, additional use of a temperature sensor is unnecessary for the calibration, which leads to cost reduction.

DETAILED DESCRIPTION OF THE PREFERRED EMBODIMENTS

Referring now to the accompanying drawings, preferred embodiments of the invention will be hereinafter described in detail.

First Embodiment

Figure 1:
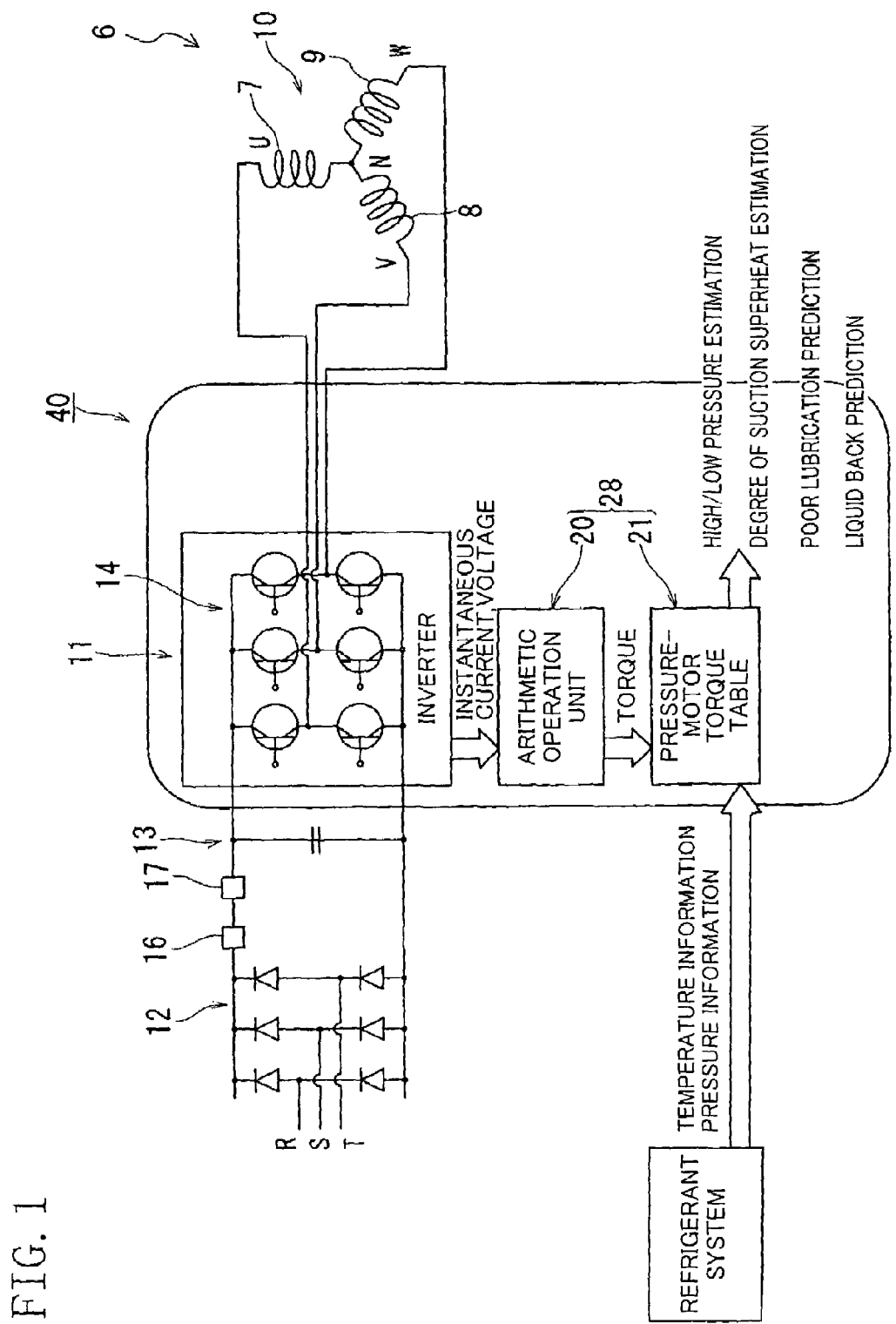
FIG. 1 is a schematic diagram of a drive unit for a compressor according to a first embodiment.

FIG. 1 schematically illustrates a drive unit 40 for a compressor 1, which has a prediction system (prediction means) 28 for predicting the internal condition of the compressor 1. The drive unit 40 for the compressor 1, which includes the prediction system 28, is used for the air conditioner (i.e., refrigerator) shown in FIG. 2.

This air conditioner has a refrigerant circulation circuit (refrigerant system) which is a refrigerant circuit wherein the compressor 1, an outdoor heat exchanger 2, and an expansion valve (electric expansion valve) 3 and an indoor heat exchanger 4 are all connected in series. Cooling operation and heating operation are possible for the refrigerant circulation circuit by switching a four-way switching valve 5. The outdoor heat exchanger 2 and the indoor heat exchanger 4 are provided with temperature detecting means 22 and 23, respectively, to detect the refrigerant temperature of the heat exchangers 2 and 4. The temperature detecting means 22 and 23 each consist of a temperature sensor such as a temperature thermistor.

As shown in FIG. 1, the compressor 1 includes a three-phase coil 10 having a U phase 7, V phase 8, and W phase 9, and a brushless DC motor 6 equipped with an inverter 11. The inverter 11 employs a sine wave PWM control method. In this inverter 11, an input a.c. power is converted into a d.c. power by an AC-DC conversion circuit section 12, and this d.c. power is smoothed by a smoothing circuit section 13 and then converted into an a.c. power having desired frequency by an inverter section 14 which is a DC-AC conversion circuit section.

The inverter 11 is controlled by an inverter signal released from an inverter controlling means (not shown), and, in return, controls frequency and voltage by changing the ON-OFF pattern of the transistor of the inverter section 14.

An instantaneous current flowing into the three-phase coil 10 of the motor 6 is detected by a current detector (current sensor) 16, and an instantaneous voltage applied to the three-phase coil 10 of the motor 6 is detected by a voltage detector (voltage sensor) 17. In this case, the current detector 16 and the voltage detector 17 constitute detecting means and are formed between the AC-DC conversion circuit section 12 and the smoothing circuit section 13. The voltage is obtained by calculating the ON/OFF ratio and DC voltage of the transistor, whereas the current is obtained from the switch pattern and DC current of the transistor.

Figure 2:
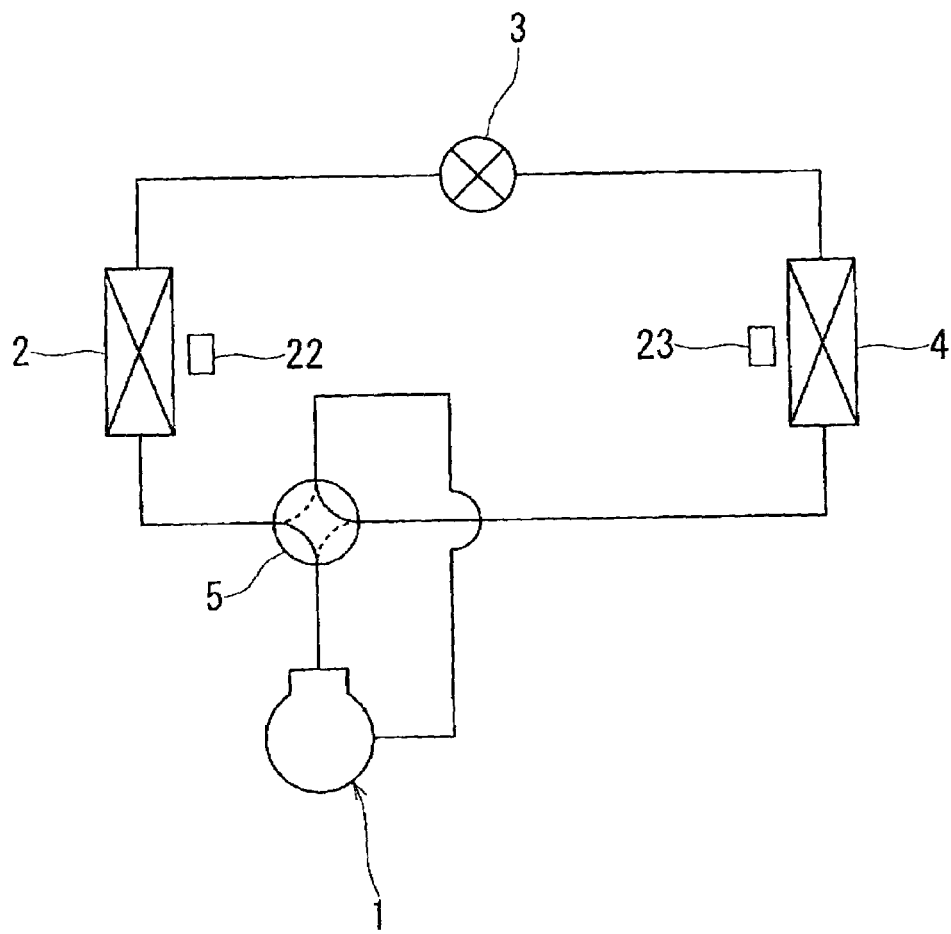
FIG. 2 is a schematic diagram of an air conditioner provided with the drive unit for a compressor.

In the air conditioner described above, when performing cooling operation, the four-way switching valve 5 is changed to the state indicated by solid line in FIG. 2, thereby actuating the motor 6 of the compressor 1. This causes the refrigerant discharged from the compressor 1 to be expanded by the expansion valve 3 in vacuo after passing through the outdoor heat exchanger 2, and to return to the compressor 1 by way of the indoor heat exchanger 4. At that time, the outdoor heat exchanger 2 functions as a condenser, while the indoor exchanger 4 functioning as an evaporator, so that cooling operation is performed.

When performing heating operation, the four-way switching valve 5 is changed to the state indicated by dashed line in FIG. 2, thereby actuating the motor 6 of the compressor 1. This causes the refrigerant discharged from the compressor 1 to be expanded by the expansion valve 3 in vacuo after passing through the indoor heat exchanger 4, and to return to the compressor 1 by way of the outdoor heat exchanger 2. At that time, the indoor heat exchanger 4 functions as a condenser, while the outdoor heat exchanger 2 functioning as an evaporator, so that heating operation is performed.

In both cooling and heating operations, there sometimes occurs a failure owing to damage to the inside of the compressor 1 under unsuitable operating conditions such as acceleration/deceleration of the compressor 1, an abrupt change in load, and operating faults in other apparatus than the compressor 1. To cope with this, the prediction system 28 is designed to predict the internal condition of the compressor 1, thereby informing occurrence of a failure in advance, determining the location of a fault, or predicting the cause of the fault.

More specifically, the prediction system 28 shown in FIG. 1 predicts the internal condition of the compressor from the detection values of the instantaneous current and/or instantaneous voltage of the coil 10. The prediction system 28 is equipped with a computing means 20, i.e., an arithmetic operation unit and a memory means 21, i.e., a storage unit. The computing means 20, the memory means 21 and others constitute a microcomputer.

The computing means 20 constitutes an identification means for identifying a parameter of a motor model from detection values obtained by the current detector 16 and the voltage detector 17. Concretely, the computing means 20 identifies a motor driving torque from the motor model.

The memory means 21 is so constructed as to derive the internal condition based on the parameter identified by the computing means 20. Concretely, the memory means 21 derives refrigerant temperature or refrigerant pressure.

The arithmetic operation for identifying the motor driving torque of the brushless DC motor 6 may use an arithmetic expression constituted by inductances and current values or an arithmetic expression constituted by a magnetic flux and current values.

The arithmetic expression constituted by inductances and current values is expressed by Equation (5) using the following Equations (1) to (4). That is, an instantaneous voltage V is represented by Equation (1), a magnetic flux φ is represented by Equation (2), and the direction of the vector of the magnetic flux is represented by Equations (3) and (4).

$$V = L \times dI/dt + d\phi/dt \quad (1)$$

where
L: inductance
φ: magnetic flux $$\phi = \int V dt + L \times I \quad (2)$$

$$\phi \cos \theta = \int V\alpha dt + L \times I\alpha \quad (3)$$

$$\phi \sin \theta = \int V\beta dt + L \times I\beta \quad (4)$$

Based on Equations (1) to (4), θ can be predicted. In other words, a motor position (i.e., the position of the rotor) can be predicted from the instantaneous current I and instantaneous voltage V which have been detected. The detection values and constants, which are used in the above prediction, are used without change and current values id and iq are obtained from coordinate conversion of input current values iu, iv and iw of the compressor 1. These values are then substituted in Equation (5), thereby determining a motor driving torque Tm.

$$Tm = P \times \{\phi a + (Ld - Lq) \times id\} \times iq \quad (5)$$

where
P: polar logarithm
id, iq: current values obtained from coordinate conversion of input currents of the compressor
φa: flux linkage generated by permanent magnets
Ld: d-axis inductance
Lq: q-axis inductance The arithmetic equation constituted by the magnetic flux and the current values is for obtaining a torque which is the outer product of a primary magnetic flux and current and works on a stator. The rotor torque of the motor 6 serves as a reaction force against stator torque. Therefore, the motor driving torque can be given by Equation (6).

$$Tm = P \times (\lambda\alpha \times i\beta - \lambda\beta \times i\alpha) \quad (6)$$

where
P: polar logarithm
λα, λβ: primary magnetic flux (a drop in motor terminal voltage on the basis of time product-resistance)
iβ, iα: primary current (motor line current)

In Equation (6), α and β are the coordinates of a fixed coordinate system and three phases u, v, w are transformed into two phases. λα is calculated by the following Equation (7), and λβ by Equation (8):

$$\lambda\alpha \approx \int V\alpha dt \quad (7)$$

$$\lambda\beta \approx \int V\beta dt \quad (8)$$

Figure 3:
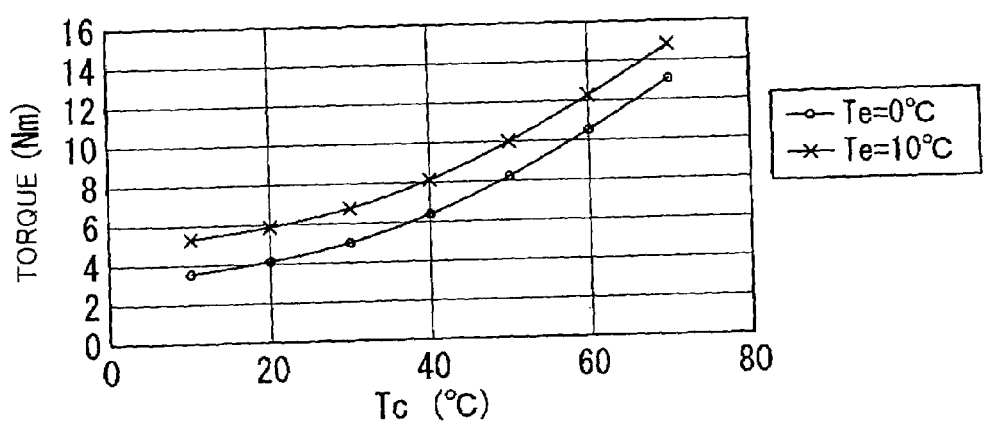
FIG. 3 shows the relationship between the torque and high pressure of the air conditioner.

Temperature information on the refrigerant system (evaporation temperature and condensation temperature detected by the temperature detecting means 22 and 23), indicative of the refrigerant state of the refrigerant circulation circuit, is input to the memory means 21. As shown in FIG. 3, a torque-high pressure graph (i.e., torque—condensation temperature graph) for a plurality of evaporation temperatures Te is prepared beforehand for every revolution speed of the compressor 1 and stored in the memory means 21. Therefore, the prediction system 28 can estimate, based on these graphs, a condensation temperature Tc from the calculated motor driving torque Tm and an evaporation temperature Te and estimate a condensing pressure (high refrigerant pressure) Pc from this condensation temperature Tc, based on the refrigerant properties.

For example, if the motor driving torque Tm is 10 Nm in the case where the revolution speed of the compressor 1 is 60 rps and the evaporation temperature Te is 10° C., the condensation temperature Tc is estimated to be about 50° C.

A torque-low pressure graph (i.e., torque-evaporation temperature graph) corresponding to a plurality of condensation temperatures Tc is prepared beforehand for every revolution speed of the compressor 1. Based on these graphs, an evaporation temperature Te can be estimated from the motor driving torque Tm and the condensation temperature Tc, and an evaporating pressure (low refrigerant pressure) Pe can also be estimated from this evaporation temperature Te.

Thus, a condensation temperature Tc and evaporation temperature Te can be estimated, and this control provides the following advantages. When measuring a condensation temperature Tc or an evaporation temperature Te as in the conventional systems, a considerable time delay occurs by the time the temperature of the measurement part reaches a stationary temperature so that a correct measurement value cannot be attained. In contrast with this, such a time delay does not occur in estimating a high refrigerant pressure or constant refrigerant pressure from a motor driving torque. Therefore, the protective control for preventing abnormalities in high and low pressures can be carried out without delay. As a result, severe damage can be avoided.

The condensation temperature Tc and evaporation temperature Te, which are obtained by the above control, may be utilized for determination as to whether there exist abnormalities in the sensors for measuring a condensation temperature Tc and evaporation temperature Te.

In addition, the relationship between motor driving torque and the degree of suction superheat may be grasped for every specified temperature condition and/or pressure condition of the refrigerant system. In this case, the degree of suction superheat of the compressor 1 in operation can be estimated based on a detected motor driving torque and temperature and/or pressure information obtained at that time. More concretely, the relationship between motor driving torque Tm and the degree of suction superheat SH is obtained for every specified condensing pressure Pc and evaporation pressure Pe to prepare torque-degree of superheat graphs beforehand. Then, the relationship graph such as shown in FIG. 4, which corresponds to a detected condensation pressure PC and evaporation pressure Pe, is selected from them, and the degree of suction superheat at that time is estimated from the motor driving torque Tm which has been obtained (calculated).

Figure 4:
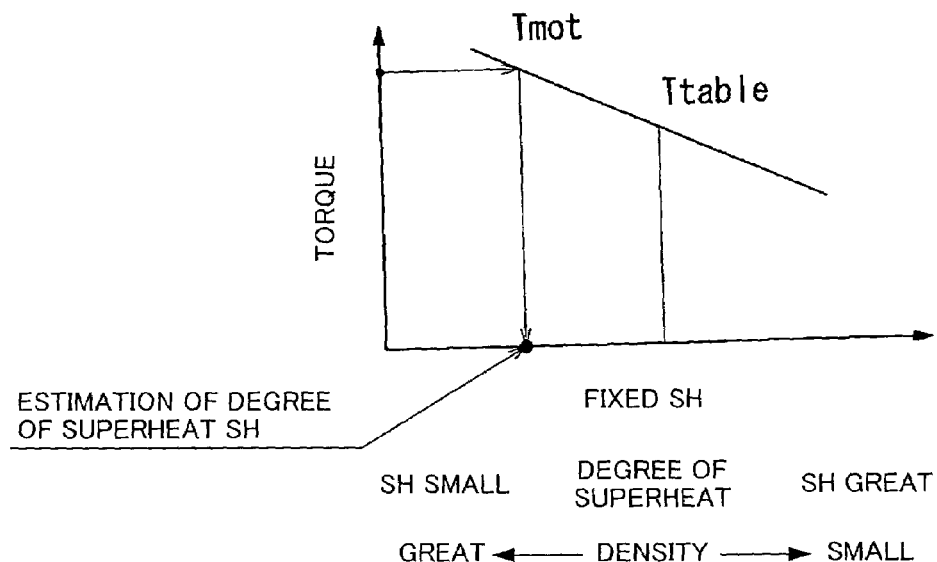
FIG. 4 shows the relationship between the torque and degree of superheat of the air conditioner.

In the torque-degree of superheat graph shown in FIG. 4, the degree of suction superheat is plotted on the abscissa, whereas motor driving torque is plotted on the ordinate. Therefore, if the calculated torque is Tmot in FIG. 4 for instance, the degree of suction superheat can be estimated from the value of the point corresponding to Tmot on the axis (abscissa) representing the degree of suction superheat. Thereby, if the estimated degree of suction superheat is inadequate, it can be adjusted to a suitable value thereby avoiding excessive overheating and wet operation.

It should be noted that the prediction system 28 may detect a steady state (i.e., a steady state instantaneous torque or steady state instantaneous current) beforehand from the motor driving torque or motor driving current and the temperature and/or pressure information on the refrigerant system. And the data on the steady state may be stored in the memory means 21, and the internal condition such as poor lubrication or liquid compression may be predicted by comparing a detected instantaneous torque or instantaneous current with the stored data table.

Figure 5:
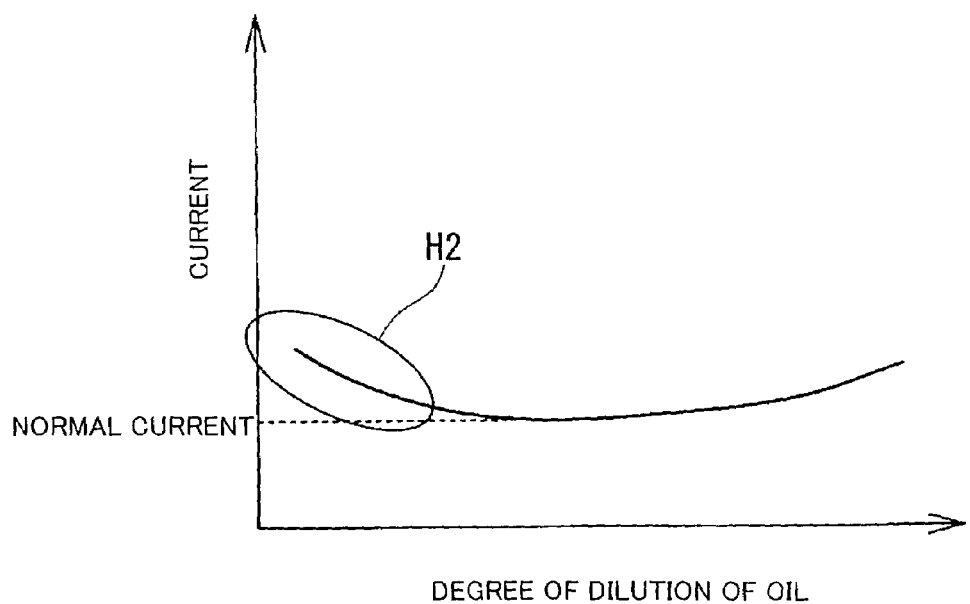
FIG. 5 shows the relationship between the degree of oil dilution and current of the air conditioner.
Figure 7:
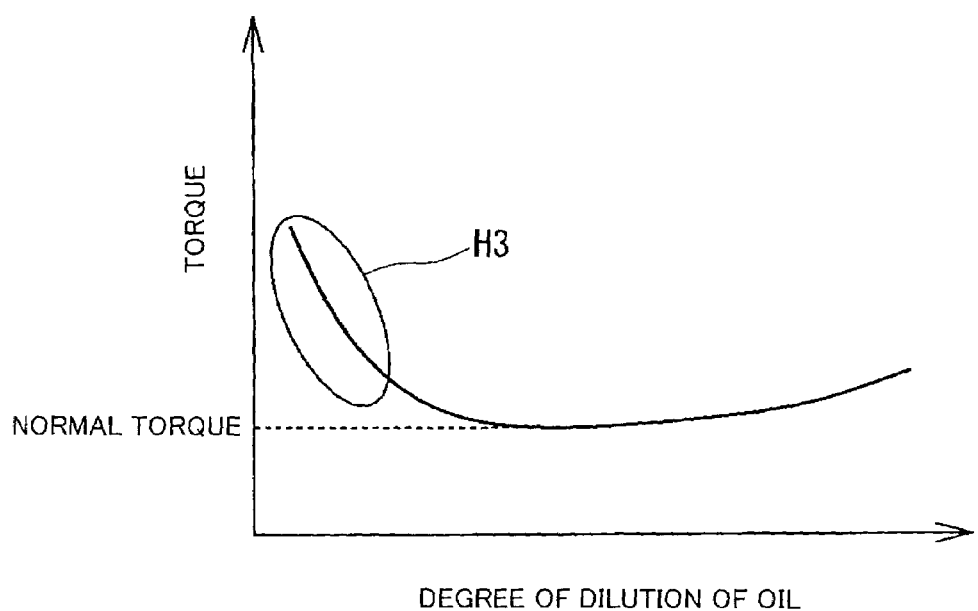
FIG. 7 shows the relationship between the torque and degree of oil dilution of the air conditioner.

Regarding the friction properties of the slip surface, when insufficiently lubricated, the slip surface becomes rough, causing increases in friction resistance. In this case, the portion corresponding to the range H2 shown in FIG. 5 increases significantly, compared to the stationary current indicated by dashed line. In the graph of FIG. 7 which shows the relationship between the degree of dilution of oil and torque, the torque in the range H3 increases significantly, compared to the stationary torque.

Figure 6:
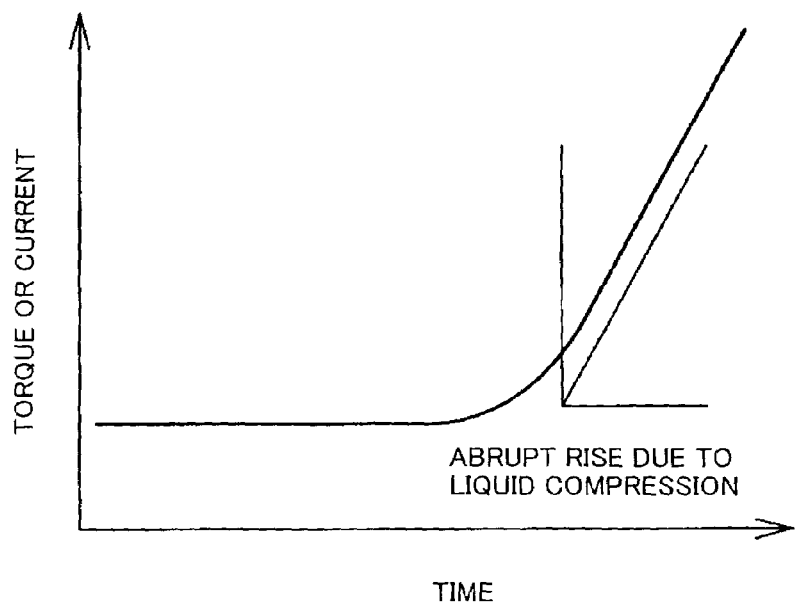
FIG. 6 shows the relationship between the torque etc. of the air conditioner and time.

In the case of liquid compression or the like, there occurs a big rise in torque or current, as shown in FIG. 6. The big rise expressed herein is such a rise that exceeds a preset amount. Therefore, it is possible to detect occurrence of poor lubrication, liquid compression, etc., from a big rise in load torque, because when shaft abnormalities occur in the compressor 1, load torque increases more significantly than when the compressor 1 is in its normal state. If such a rise is detected, the operation frequency of the compressor 1 is reduced to avoid abnormal operation.

Instead of judging the amount of increase in torque or current to predict occurrence of abnormal operation as described earlier, a rapid increase in torque or current may be utilized. That is, occurrence of abnormal operation may be predicted when the amount of increase (i.e., the increasing rate) in torque or the like per unit time exceeds a reference value.

Figure 9:
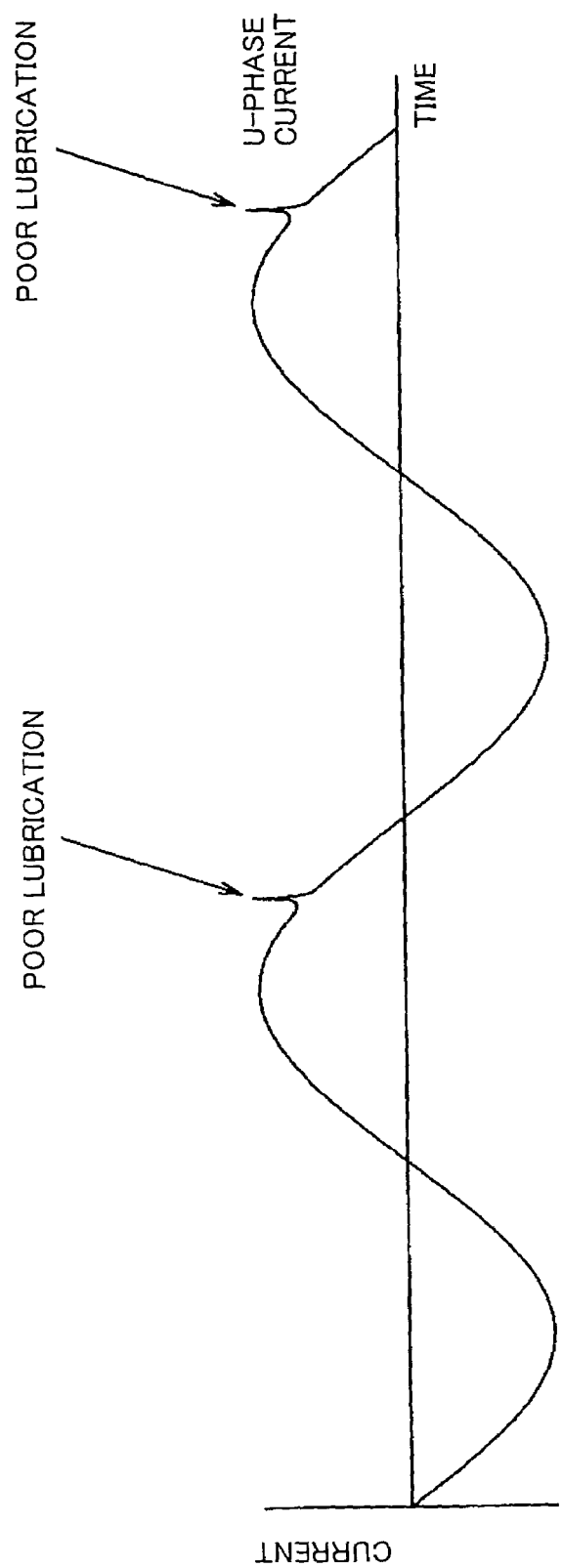
FIG. 9 is a waveform chart showing the higher harmonic component of an instantaneous current of the drive unit shown in FIG. 8.

The instantaneous current can be expressed with a sine wave, and if this current has an abnormal waveform as shown in FIG. 9, it is then predicted that an impact load such as shaft abnormalities or liquid compression has been imposed. More concretely, if an impact load such as shaft abnormalities or liquid compression is imposed, distortion will occur in the waveform of the current, forming what is called "a mustache stands." as shown in FIG. 9. Accordingly, the waveform is detected and if a mustache stands in this waveform, it is then predicted that an impact load has been imposed.

That is, the internal condition of the compressor 1 is predicted based on the amount of distortion produced in the sine wave, the distortion amount being obtained by analysis of the higher harmonic component of the detected instantaneous current. Accordingly, poor lubrication etc. is predictable based on distortion in an instantaneous current.

In addition to the prediction of poor lubrication etc. based on the amount of distortion, judgments based on the number of repetitions for every machine rotation frequency are possible. Namely, it is possible to make a judgment from the number of repetitions of distortion greater than a certain value or from the total amount of distortion which repeatedly occurs.

Figure 8:
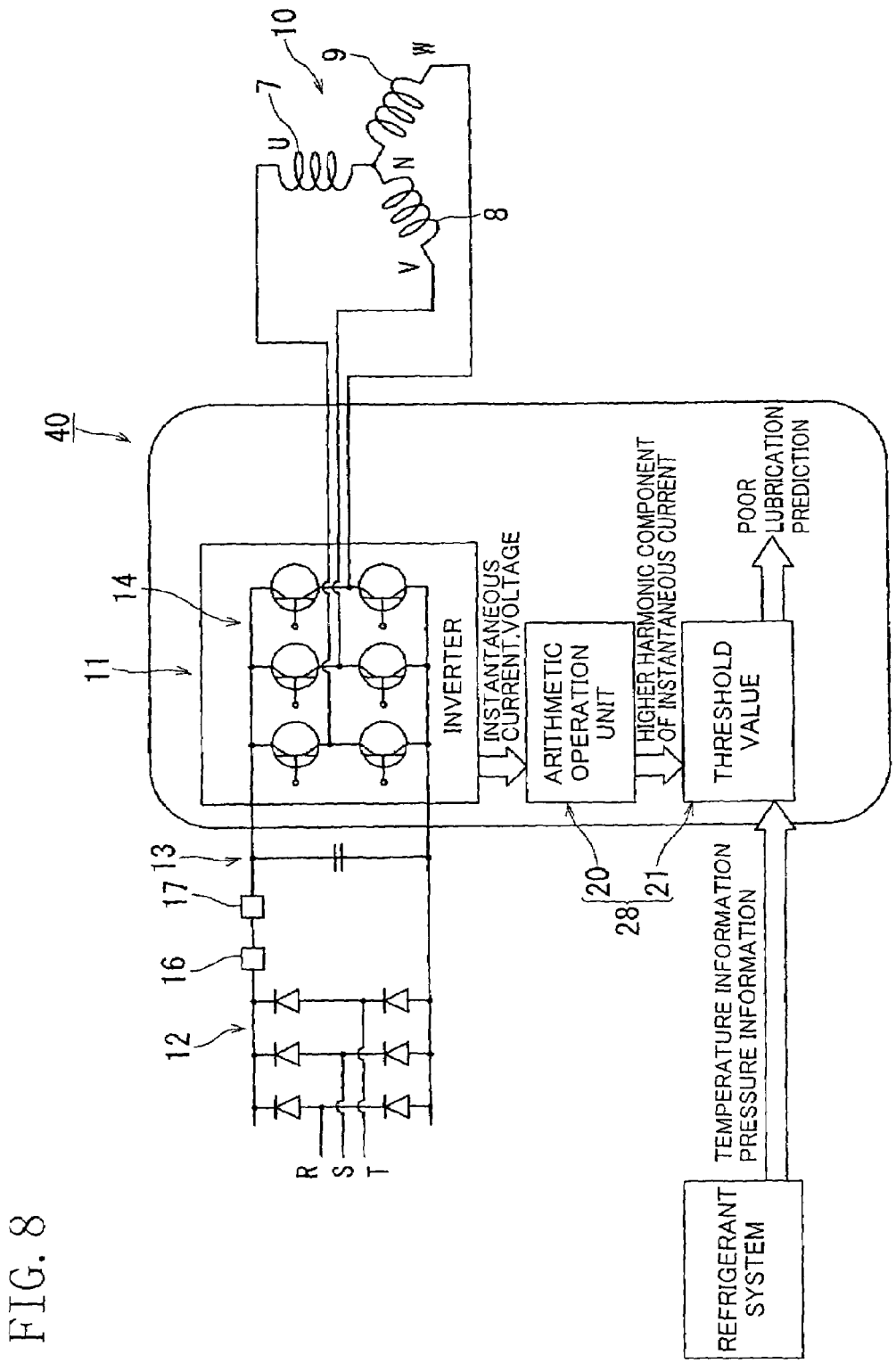
FIG. 8 is a schematic diagram showing a modification of the drive unit of the first embodiment.

Accordingly, the prediction system 28 should be designed such that, like the modification shown in FIG. 8, the memory means 21 stores a threshold value (specified reference value) in accordance with temperature information and/or pressure information from the refrigerant system and the computing means 20 analyzes the higher harmonic component of an instantaneous current.

With this arrangement, occurrence of poor lubrication, liquid compression or the like can be predicted by comparing the threshold value with the waveform of the higher harmonic component of a detected instantaneous current. In such a case, abnormal operation can be avoided, for instance, by reducing the operation frequency of the compressor 1. In addition, since the threshold value (specified reference value) is set based on temperature information and/or pressure information from the refrigerant system, the reliability of the detected internal condition can be increased. As a result, a failure in the compressor can be prevented without fail.

Modification

Figure 10:
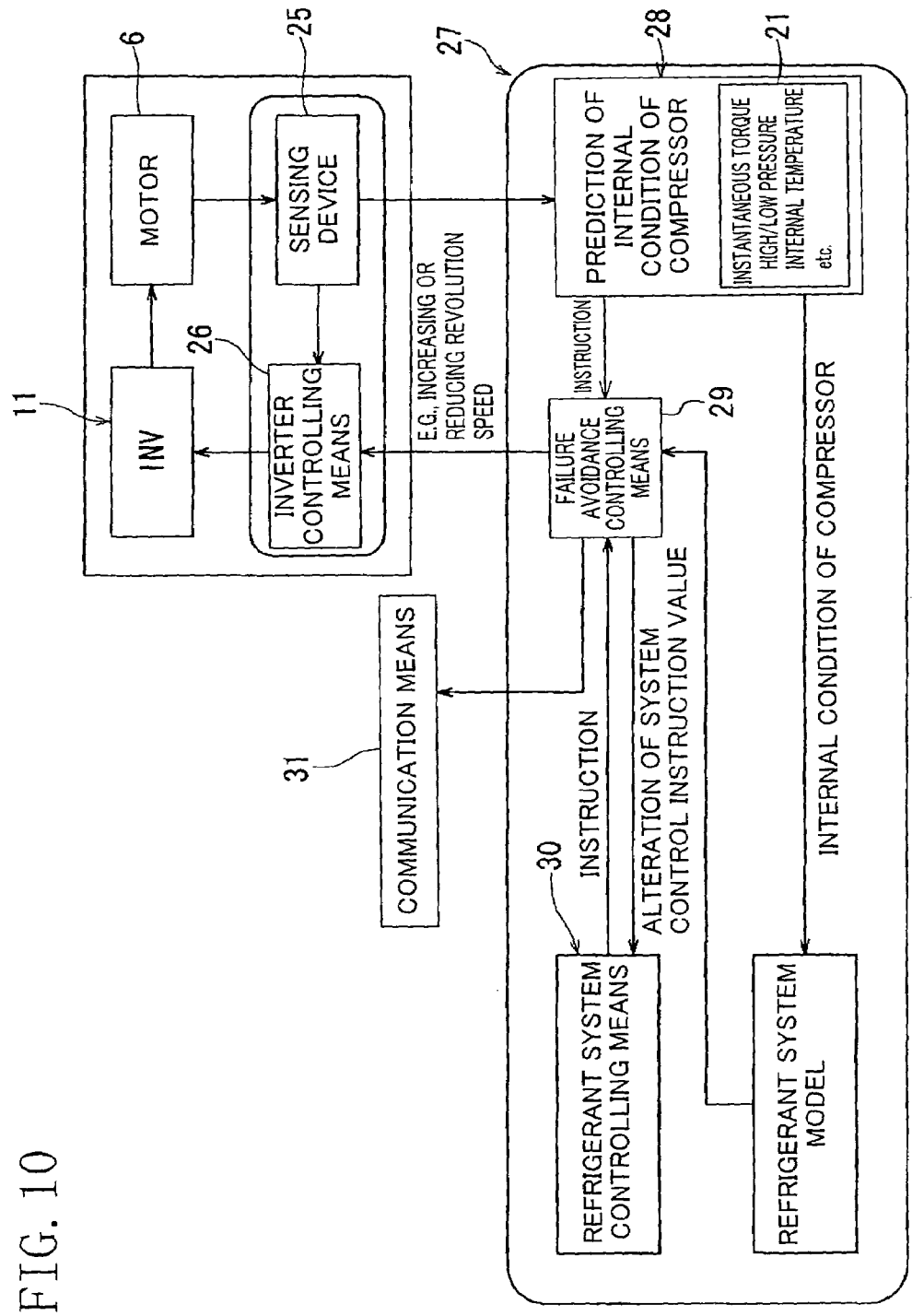
FIG. 10 is a schematic diagram showing another modification of the drive unit for a compressor.

Now, reference is made to FIG. 10 which shows an air conditioner constructed according to a modification of the first embodiment.

In this case, an instantaneous current and/or instantaneous voltage of the three-phase coil 10 of the motor 6 is detected, and the internal condition of the compressor 1 is predicted from the detection values. Based on this predicted internal condition, an inverter signal from an inverter controlling means 26 for driving the compressor 1 is varied, thereby performing a protective operation of the compressor 1. "The protective operation" of the compressor 1 discussed herein is a failure avoidance operation for preventing occurrence of poor lubrication, liquid compression, etc.

Concretely, the compressor 1 has the motor 6, the inverter 11, a sensing device 25 serving as a detecting means for detecting an instantaneous current and/or instantaneous voltage applied to the motor 6, the inverter controlling means 26, and a control unit 27. The control unit 27 includes the prediction system 28 and a failure avoidance controlling means 29 which receives an instruction from the prediction system 28. The prediction system 28 is provided with the memory means 21 and the computing means 20 (not shown in FIG. 10 but shown in FIG. 1). Since other arrangements are the same as in the air conditioner shown in FIG. 1, the parts corresponding to those of FIG. 1 are identified by the same reference numerals and there will be omitted an explanation thereof.

Thus, in the air conditioner shown in FIG. 10, an instantaneous current and/or instantaneous voltage of the coil 10 of the motor 6 are detected, and the internal condition (poor lubrication, liquid compression, etc.) of the compressor is predicted from the detection values. Then, the information on the internal condition of the compressor is input to the failure avoidance controlling means 29.

Stored in the failure avoidance controlling means 29 is data from a preset refrigerant system model. The failure avoidance controlling means 29 inputs an instruction signal from a refrigerant system controlling means 30 for performing operation control on the refrigerant system.

Accordingly, in the air conditioner of FIG. 10, the internal condition of the compressor 1 is predicted, and the operating condition of the refrigerant circulation circuit is predicted based on the refrigerant system model. If the content of the prediction is poor lubrication, a control signal will be output to the inverter controlling means 26 of the compressor 1 from the failure avoidance controlling means 29 in order to avoid poor lubrication. To this end, control for varying the revolution speed of the motor 6 (the object of the control) or control for varying the value of a system control instruction (operation control parameter) issued from the refrigerant system controlling means 30 is performed, whereby abnormal operation is avoided.

When carrying out air-conditioning operation, the refrigerant system controlling means 30 controls various units. The internal condition of the compressor 1 is predicted at that time, and if it is found that an operation with an abnormality such as poor lubrication is being carried out, the control by the inverter controlling means 26 (the protective operation of the compressor 1) is performed in preference to the operational control by the refrigerant system controlling means 30. With this arrangement, the reliability of the avoidance of a failure in the compressor 1 can be improved.

If the predicted internal condition is normal, a shift from the above protective operation to the steady operation is made. More specifically, the failure avoidance controlling means 29 includes a switching means (not shown). This switching means is designed to switch the compressor 1 to the protective operation if it is predicted an operation with an abnormality such as poor lubrication is being carried out and to switch the compressor 1 to the steady operation if it is predicted that normal operation has been recovered. This leads to high-efficiency operation of the air conditioner.

The failure avoidance controlling means 29 may be designed to make a system failure diagnosis based on the predicted internal condition of the compressor 1. As used herein, the term "failure diagnosis" means that poor lubrication is diagnosed from the distortion of a detected instantaneous current, liquid compression is diagnosed from a change in a detected instantaneous current, or abnormalities in the degree of suction superheat are diagnosed by estimating high and low pressures. The result of this diagnosis is stored in the memory means 21. Therefore, the result of the system failure diagnosis can be utilized for correction of faults, for example, after stopping operation.

Thus, a failure diagnosis can be made in the air conditioner shown in FIG. 10. Moreover, this failure diagnosis has high reliability so that the locations of faults can be determined and the cause of the faults can be predicted based on the failure diagnosis. This makes it possible to correct the faults and remove the cause of the faults so that operation in a troubled condition can be avoided.

The failure avoidance controlling means 29 may not make a failure diagnosis, but may make a failure forecast when it is predictable that a failure will occur if operation is continued. As used herein, the term "failure forecast" means that poor lubrication is predicted from, for example, the distortion of a detected instantaneous current. The information on the failure forecast is transmitted to the outside (i.e., to the user or the like) through a communication means 31. The communication means 31 is constituted by a display means (such as flickering of indication light or sound generation) for informing the user etc. of the information on the failure forecast.

The air conditioner shown in FIG. 10 accordingly makes a failure forecast and this failure forecast has high reliability so that abnormal operation entailing a failure can be avoided based on it. Further, since the information on the failure forecast can be transmitted to the outside through the communication means 31, the user or the like will be informed of it and can cope with the failure.

Another Modification of the First Embodiment

While the first embodiment of the invention has been described, it is apparent that the invention is not limited to the first embodiment but may be modified into various forms within the scope of the invention.

For instance, although high and low pressures, the degree of suction superheat, poor lubrication, liquid compression, etc. are predictable for the air conditioner shown in FIG. 1, the object to be predicted may be any one of them or arbitrary combinations of items selected from them.

Although the protective operation of the compressor 1, the failure diagnosis, and the failure forecast are all possible for the air conditioner shown in FIG. 10, the invention is equally applicable to other types of air conditioners. For instance, in one alternative, the protective operation is performed, but the failure diagnosis and the failure forecast are not made. In another alternative, the failure diagnosis can be made, but the protective operation and the failure forecast are not performed. In another alternative, the failure forecast can be made, but the protective operation and the failure diagnosis are not performed. Other alternatives are also possible, which employ arbitrary combinations of functions selected from the above.

In addition, the specified reference value for a rapid rise in an instantaneous current, which is used for the prediction of the internal condition, and the specified reference value for a rapid rise in an instantaneous motor driving torque, which is used for the prediction of the internal condition, can be arbitrarily altered upon condition that the alteration does not cause an abnormal operation.

The drive unit 40 for the compressor 1 may have the function of outputting information such as a predicted motor driving torque, temperature, high pressure, low pressure and shaft lubricating condition. Alternatively, the drive unit 40 may input information on the refrigerant system to calculate information intended for improved accuracy or system optimum operation.

Thus, information such as a predicted motor driving torque can be output, so that the user can correctly grasp the internal condition of the compressor 1. Information intended for improved accuracy and system optimum operation can be calculated, so that it becomes possible to achieve improvements in accuracy and perform system optimum operation.

The motor 6 is not limited to a brushless DC motor.

In the case where the internal condition of the compressor 1 is predicted by use of a motor model, a need for an accumulator, pressure sensor, pressure switch or suction pipe temperature sensor can be obviated.

Concretely, in the case where the liquid compression of the compressor 1 is predicted as described earlier, an accumulator is unnecessary for the air conditioner shown in FIG. 2. For instance, a motor driving torque, which is a parameter of the motor model, is identified and liquid compression is predicted from this motor driving torque. That is, liquid back is predicted. Therefore, liquid back can be avoided without use of an accumulator in the refrigerant circulation circuit.

The above arrangement is suited especially for the case where the compressor 1 is a rotary compressor. Since one compression occurs for every rotation in the rolling-piston type compressors and the so-called swing-type compressors in which a piston and a blade are integrally formed, these compressors have the problems of high-speed compression and rapid rises in pressure caused by liquid back. The prediction of liquid back as described in the first embodiment enables reliable prevention of liquid back without use of an accumulator.

In the case where a motor driving torque is identified and a refrigerant pressure is estimated from this motor driving torque, a need for a high-pressure sensor and a high-pressure switch provided for the discharge side of the compressor 1 can be obviated. Further, a need for a low-pressure sensor provided for the suction side of the compressor 1 can be eliminated.

In the case where a motor driving torque is identified and the degree of superheat of the refrigerant of the compressor is predicted from this motor driving torque, a need for a suction pipe temperature sensor provided for the suction side of the compressor 1 can be eliminated.

Second Embodiment

Next, a second embodiment of the invention will be described with reference to the drawings. There will be explained only the parts of the second embodiment that differ from those of the first embodiment shown in FIG. 1. That is, in the second embodiment, the parts corresponding to those of FIG. 1 are identified by the same reference numerals and there will be omitted a detailed explanation thereof.

Figure 11:
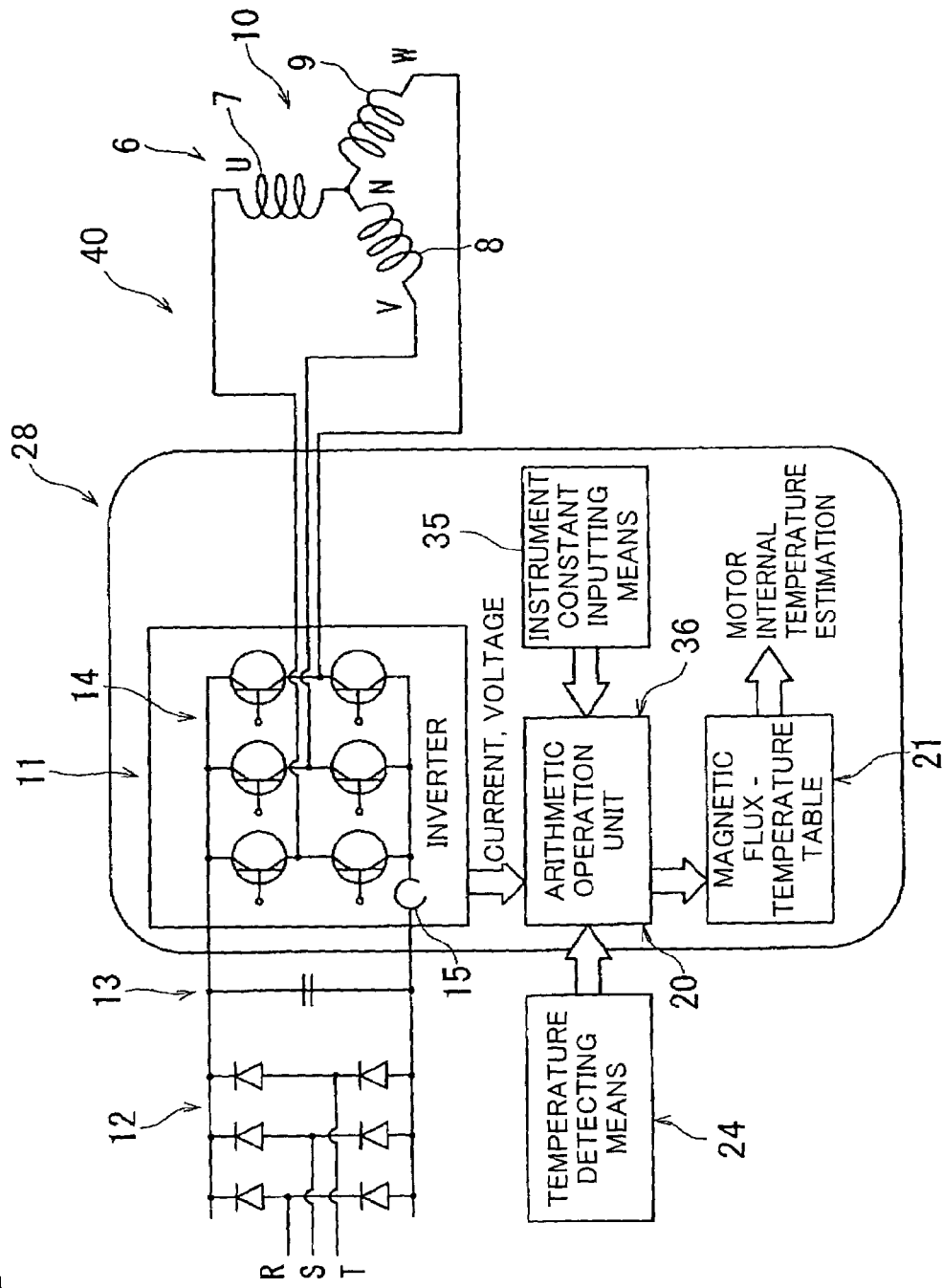
FIG. 11 is a schematic diagram of a drive unit for a compressor according to a second embodiment.

As shown in FIG. 11, a detecting means 15 is provided for the inverter section 14 in place of the current detector 16 and voltage detector 17 of the first embodiment. The detecting means 15 detects the current and voltage of the three-phase coil 10 of the brushless DC motor 6. The detecting means 15 has a current detecting section composed of a current detection sensor or the like capable of detecting current, and a voltage detecting section composed of a voltage detection sensor or the like capable of detecting voltage.

Figure 13:
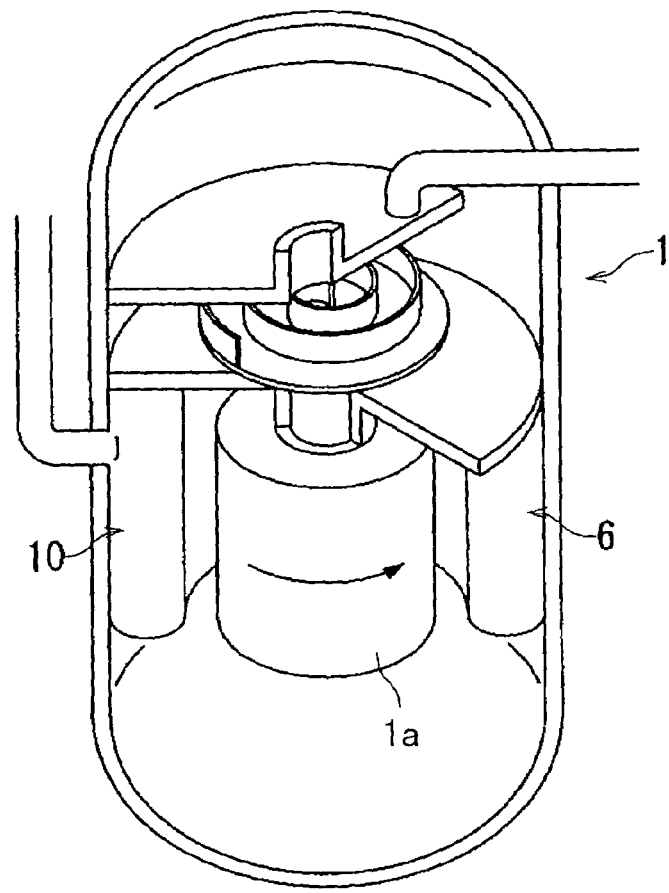
FIG. 13 is a partially cut-away perspective view of the compressor according to the second embodiment.
Figure 14:
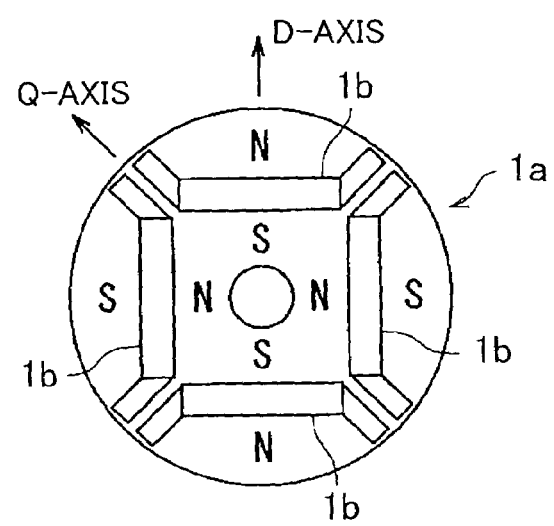
FIG. 14 is a schematic plan view of a blushless DC motor.

As shown in FIG. 13, the compressor 1 is made in the form of a scroll, and its brushless DC motor 6 has an armature 10 (i.e., coil) and a rotor 1a. In this case, the rotor 1a of the brushless DC motor 6 has a magnet-embedded structure in which magnets (permanent magnets) 1b . . . are embedded inside thereof as shown in FIG. 14. Incidentally, the permanent magnet synchronous motor (PMSM) is a motor in which mechanical rectification caused by the brush and commutator of a direct-current motor is replaced by the switching action of a semiconductor, and is called a brushless DC motor. Since the PMSM is formed such that mechanical rectification is replaced by the switching action of a semiconductor, it has a rotary magnetic field system structure where the magnets (permanent magnets) 1b are formed in the rotor side whereas the armature 10 in the stator side. The rotating position of the rotor 1a of the brushless DC motor 6 is estimated using current, voltage and instrument constants, and the brushless DC motor 6 is controlled based on the result of the estimation of the rotating position.

Figure 12:
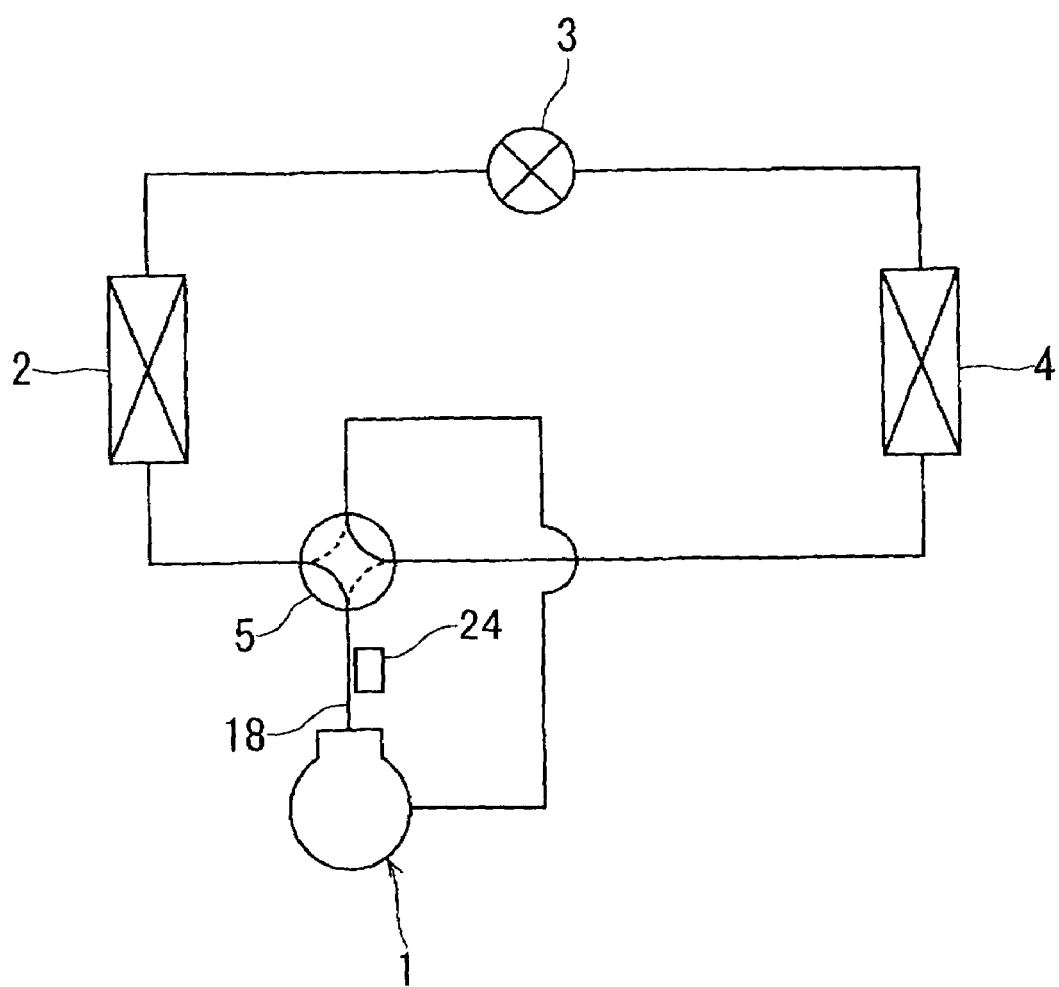
FIG. 12 is a schematic diagram of an air conditioner provided with the drive unit of the second embodiment.

In the refrigerant system shown in FIG. 12, a temperature detecting means 24 is formed in a discharge pipe 18 of the compressor 1. This temperature detecting means 24 detects the discharge pipe temperature of the compressor 1.

The prediction system 28 is constructed as a motor temperature estimation system, and an estimated motor temperature is regarded as the internal temperature of the compressor 1. This prediction system 28 is equipped with the above detecting means 15, the computing means 20 (i.e., arithmetic operation unit), the memory means 21 (i.e., storage unit), and an instrument constant inputting means 35.

In this case, the estimation of a motor temperature is made by estimating the temperature of the magnets (permanent magnets) 1b in the rotor 1a from the current and voltage of the motor 6 and instrument constants. Concretely, a motor temperature is estimated using a motor model (rotating coordinate system model) composed of the current and voltage of the motor 6, resistance and inductance, the resistance and inductance being an instrument constant.

That is, the computing means 20 is so constructed as to identify the magnetic flux characteristic value of the armature flux linkage of the magnets 1b, which is a parameter of the motor model.

The above memory 21 estimates a motor temperature from the identified magnetic flux characteristic value. In this estimation, the voltage equation for a PM synchronous motor shown in Equation (9) is used.

$$\begin{bmatrix} vu \\ vv \\ vw \end{bmatrix} = \begin{bmatrix} Ra+pLu & pMuv & pMwu \\ pMuv & Ra+pLv & pMvw \\ pMwu & pMvw & Ra+pLw \end{bmatrix} \begin{bmatrix} iu \\ iv \\ iw \end{bmatrix} - \begin{bmatrix} \omega\psi f \sin\theta \\ \omega\psi f \sin\left(\theta - \frac{2}{3}\pi\right) \\ \omega\psi f \sin\left(\theta + \frac{2}{3}\pi\right) \end{bmatrix} \quad (9)$$

where

Lu, Lv, Lw: self-inductances of phases

Figure 15:
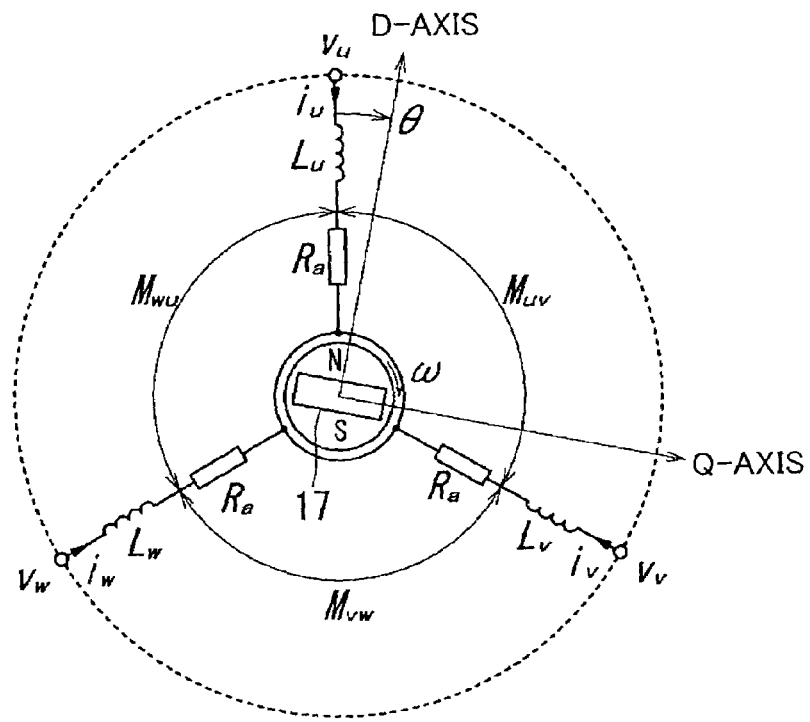
FIG. 15 shows a rotating coordinate system model for the brushless DC motor.

Muv, Mvw, Mwu: mutual inductance between phases

θ=ωt: lead angle of d-axis from U-phase

ω: electrical angular velocity

ψf: maximum value of armature flux linkage produced by permanent magnets per phase vu, vv, vw: armature voltages of phases iu, iv, iw: armature currents of phases p=d/dt: differential operator Ra: resistance of armature winding Like the basic model (rotating frame model) for the three-phase PMSM having two poles as shown in FIG. 15, a d-axis is plotted in the direction of the N-pole of the magnets 1b and a q-axis is plotted in the direction which is shifted forward from the d-axis by π/2. If the lead angle of the d-axis, which is clockwise shifted based on the U-phase winding, is represented by θ, the self-inductances of the armature are described by Equation (10), the mutual inductance by Equation (11), and the armature flux linkage of the magnets 1b by Equation (12).

$$\begin{aligned} Lu &= la + La - Las\cos 2\theta \\ Lv &= la + La - Las\cos\left(2\theta + \frac{2}{3}\pi\right) \\ Lw &= la + La - Las\cos\left(2\theta - \frac{2}{3}\pi\right) \end{aligned} \quad (10)$$

where

Lu, Lv, Lw: self-inductances of phases la: leakage inductance per phase

La: average of effective inductance per phase

Las: amplitude of effective inductance per phase

θ=ωt: lead angle of d-axis from U-phase

ω: electrical angular velocity $$\begin{aligned} Muv &= -La - \frac{1}{2}Las\cos\left(2\theta - \frac{2}{3}\pi\right) \\ Mvw &= -La - \frac{1}{2}Las\cos 2\theta \\ Mwv &= -La - \frac{1}{2}Las\cos\left(2\theta + \frac{2}{3}\pi\right) \end{aligned} \quad (11)$$

where

Figure 16:
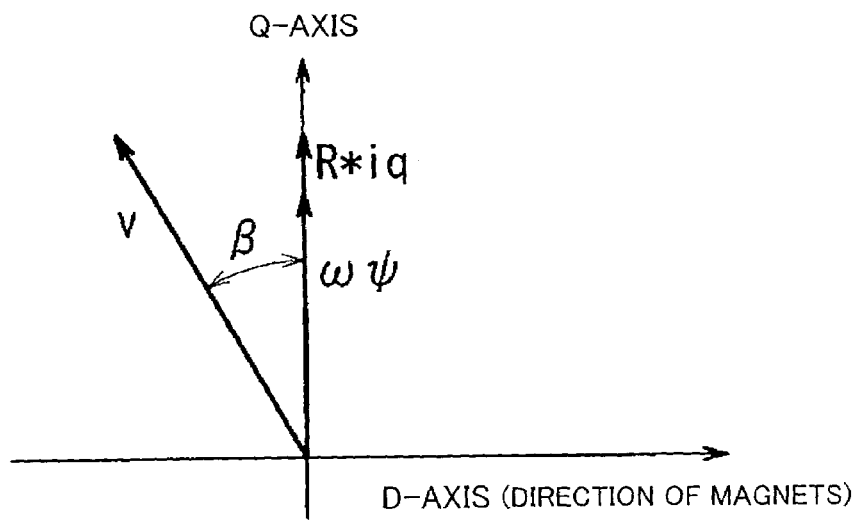
FIG. 16 is a graph used for obtaining a magnetic flux characteristic value from a motor voltage equation, the magnetic flux characteristic value being associated with an armature flux linkage generated by magnets.
Figure 17:
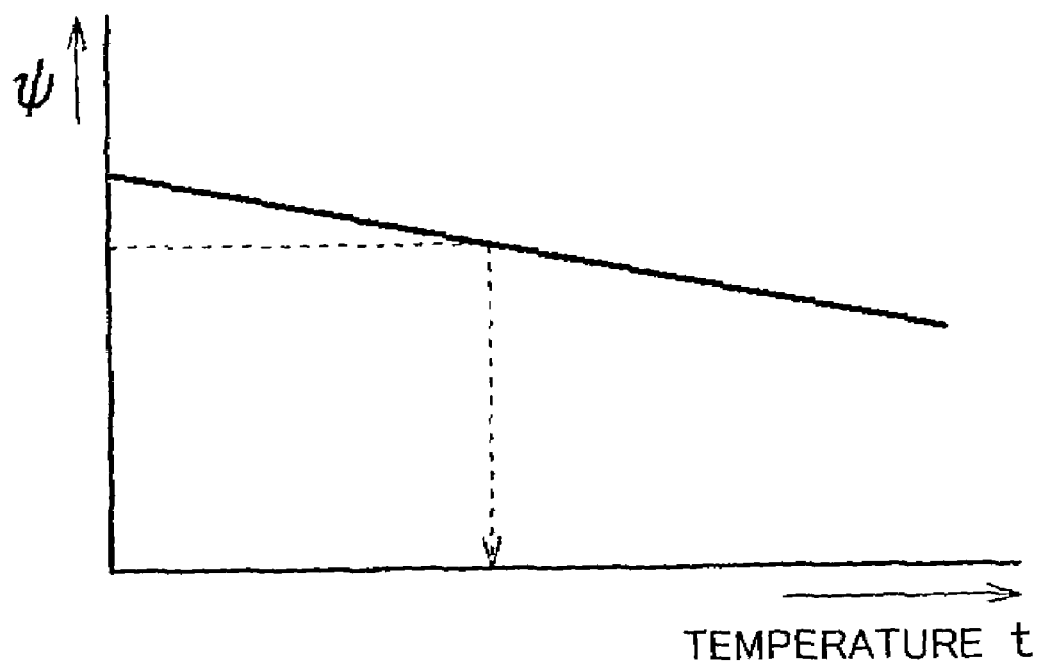
FIG. 17 shows the relationship between the magnetic flux characteristic value and temperature.

Muv, Mvw, Mwu: mutual inductance between phases $$\begin{aligned} \psi fu &= \psi f\cos\theta \\ \psi fv &= \psi f\cos\left(\theta - \frac{2}{3}\pi\right) \\ \psi fw &= \psi f\cos\left(\theta + \frac{2}{3}\pi\right) \end{aligned} \quad (12)$$

where

ψfu, ψfv, ψfw: armature flux linkage produced by permanent magnets in phases

ψf: maximum value of armature flux linkage produced by permanent magnets per phase Equation (9) is obtained from Equations (10) and (12). The transformation matrix used for transformation from the three-phase coordinate system to the d, q coordinate system is given by the following Equation (13). If the basic voltage equation (Equation (9)) described earlier is converted, by use of this transformation matrix, into the d, q axis coordinate system which rotates at an electrical angular velocity of ω, the voltage equation of the PMSM is given by the following Equation (14).

$$C = \sqrt{\frac{2}{3}} \begin{bmatrix} \cos\theta & \cos\left(\theta - \frac{2}{3}\pi\right) & \cos\left(\theta + \frac{2}{3}\pi\right) \\ -\sin\theta & -\sin\left(\theta - \frac{2}{3}\pi\right) & -\sin\left(\theta + \frac{2}{3}\pi\right) \end{bmatrix} \quad (13)$$

$$\begin{bmatrix} vd \\ vq \end{bmatrix} = \begin{bmatrix} Ra+pLd & -\omega Ld \\ \omega Ld & Ra+pLq \end{bmatrix} \begin{bmatrix} id \\ iq \end{bmatrix} + \begin{bmatrix} 0 \\ \omega\psi \end{bmatrix} \quad (14)$$

where

ψ=√3/2 ψf=√3 ψe

ψe: effective value of armature flux linkage produced by permanent magnets vd, vq: d-axis and q-axis components of armature voltage id, iq: d-axis and q-axis components of armature current Ld=la+3/2 (La−Las): d-axis inductance Lq=la+3/2 (La+Las): q-axis inductance In the steady state, the differential operator p is zero in Equation (14) and therefore the motor voltage equation for the steady state is given by the following Equation (15).

$$\begin{bmatrix} vd \\ vq \end{bmatrix} = \begin{bmatrix} R & -\omega Lq \\ \omega Ld & R \end{bmatrix} \begin{bmatrix} id \\ iq \end{bmatrix} + \begin{bmatrix} 0 \\ \omega\psi \end{bmatrix} \quad (15)$$

ψ is first found from Equation (15), and the temperature of the magnets 1b is estimated from ψ. Herein, ψ designates a magnetic flux characteristic value associated with the armature flux linkage generated by the magnets 1b. More concretely, ψ can be found from ψ=√3ψe, and ψe is the effective value of the armature flux linkage generated by the magnets 1b. By setting id (the d-axis component of the armature current) to zero where β is zero and the current phase is zero as shown in FIG. 16, vq (the q-axis component of the armature voltage) is given by the following Equation (16). Equation (16) is then converted into Equation (17) from which ψ can be obtained. Once ψ is determined, the temperature (the temperature of the magnets) can be estimated from a graph (a plot of magnetic flux vs. temperature) such as shown in FIG. 17 which shows the relationship between ψ and temperature. Specifically, this graph shows the value of ψ for an actual temperature and is prepared beforehand to be stored in the memory means 21. After ψ is calculated by the computing means 20, the result of this arithmetic operation is input to the memory means 21 and the motor temperature is estimated from this.

$$Vq = R \times iq + \omega \times \psi \quad (16)$$

$$\psi = (vq - R \times iq)/\omega \quad (17)$$

When normal control is being carried out, vq is given by the following Equation (18). Equation (18) is converted into Equation (19) from which ψ can be found. The temperature (the temperature of the magnets) can be estimated from the above graph (the plot of magnetic flux vs. temperature) based on ψ thus obtained. Incidentally, in the above arithmetic operation, the motor current and motor voltage are detected by the detecting means 15. These motor current and motor voltage as well as resistance and inductance are input to the computing means 20, the resistance and inductance being instrument constants input through the instrument constant inputting means 35. Accordingly, data (numerical values) required for the above arithmetic expressions can be obtained without fail.

$$vq = \omega \times Ld \times id + R \times iq + \omega \times \psi \quad (18)$$

$$\psi = (vq - \omega \times Ld \times id - R \times iq)/\omega \quad (19)$$

The magnetic flux characteristic value of the armature flux linkage is not limited to ψ. Since $\psi = \sqrt{3}\psi e$, ψe can be used as the magnetic flux characteristic value to prepare the graph (the plot of magnetic flux vs. temperature) showing the relationship between ψe and temperature. The motor temperature may be estimated from this graph. As stated earlier, ψe is the effective value of the armature flux linkage generated by the magnets 1b.

Thus, the motor temperature (the temperature of the magnets 1b) can be estimated as described earlier, and the internal temperature of the compressor 1 can be estimated from this estimated motor temperature. From this estimated motor temperature, it is possible to determine whether the compressor 1 is normal or abnormal, so that operation in an abnormal state can be avoided thereby preventing a failure caused by, for instance, damage to the inner part of the compressor 1. It should be noted that this temperature estimation may be constantly made during operation. Alternatively, the temperature estimation may be made under a certain condition such as, for example, when the revolution speed or current of the motor has a specified value. In this case, a condition where β becomes zero is established with id (the d-axis component of armature current)=zero similarly to the case described earlier, and then, ψ is obtained to estimate the temperature therefrom.

Incidentally, once a condition where β=zero is established, a d-axis inductance Ld is no longer necessary so that operation errors caused by changes in constants due to temperature fluctuations etc. can be reduced, leading to an improvement in the accuracy of the temperature estimation. Additionally, this offers a potential for the temperature estimation for areas which are short of refrigerant gas in an air conditioner such as used in this embodiment. However, in this case, the measurement area is narrow so that there arises a need to select a measurement mode for making β zero, during operation. In the normal state where β≠zero, the temperature estimation can be made in all operation areas at all times during operation, but it is necessary to increase the accuracy of the identification of the d-axis inductance Ld. That is, both cases where β=0 and where β≠0 have a merit and a demerit, and therefore, nothing is the matter whichever is adopted.

As shown in FIG. 12, the temperature detecting means 24 is formed in the discharge pipe 18. In the air conditioner, discharge pipe temperature control based on the discharge pipe temperature of the compressor 1 is performed. Therefore, the prediction system 28 may be equipped with a calibration means 36 for adjusting an estimated temperature to an actual temperature utilizing this discharge pipe temperature if the estimated temperature differs from the actual temperature. The calibration means 36 is constituted by the computing means 20.

That is, as far as the flow rate of the refrigerant gas is normal, the discharge pipe temperature is substantially the same as the internal temperature of the compressor 1. If an estimated temperature differs from the discharge pipe temperature, the estimated temperature is incorrect. In such a case, a compensation value may be added to the estimated temperature. This calibration may be constantly carried out during operation. Alternatively, the calibration may be done on condition that the current of the motor 6 or the discharge pipe temperature falls in a specified range for a certain period of time.

Since the prediction system 28 estimates the motor temperature from the current and voltage of the motor 6 and the instrument constants, there is no need to use a temperature detecting sensor. In addition, since data for estimating the rotating position is used, additional use of other arrangements is almost unnecessary. Therefore, a highly reliable motor temperature can be obtained at low cost.

Since the temperature of the magnets 1b is estimated as the motor temperature, using the rotary coordinate system model constituted by the above current and voltage, and resistance and inductance that are instrument constants, the temperature of the magnets 1b can be easily estimated.

Further, the motor temperature can be reliably estimated by use of a simple arithmetic expression (basic voltage equation).

In addition, since a d-axis is plotted in the direction of the N pole of the magnets 1b; a q-axis is plotted in the direction which is shifted forward from the d-axis by π/2; the motor basic voltage equation for the three-phase PMSM is converted into the d, q axis coordinate system which rotates at an electric angular speed ω, thereby obtaining the motor voltage equation; a voltage equation for the steady state is obtained from this motor voltage equation; and at the time of the estimation, the d-axis component of the armature current in the steady-state voltage equation is made zero, a need to use the d-axis inductance Ld can be obviated and the number of operational elements can be reduced. Therefore, operation errors caused by changes in constants due to temperature fluctuations etc. can be lessened.

Further, the prediction system 28 can estimate the internal temperature of the compressor 1 from the motor temperature, so that the internal condition of the compressor 1 can be predicted. The reliability of the estimated temperature can be increased especially by the provision of the calibration means 36.

By virtue of this arrangement, the prediction system 28 does not judge that the compressor 1 is abnormal when it is normally operating and that the compressor 1 is normal when it is abnormally operating.

That is, if the compressor 1 is judged to be abnormal although it normally operates, the air-conditioning operation will be stopped so that the room cannot be kept comfortable. On the other hand, if the compressor 1 is judged to be normal although it abnormally operates, the air-conditioning operation will be continued, so that there is a likelihood that a failure will occur in the air conditioner or power consumption will increase.

To cope with this problem, the prediction system 28 predicts the internal condition (internal temperature) of the compressor 1 with high accuracy, which eliminates such a likelihood.

Incidentally, during operation of the compressor 1, the internal temperature of the compressor 1 is estimated at start-up, and the degree of a subsequent rise in temperature is predicted. If the temperature at start-up or the rise in temperature is unusual, the operation may be stopped. With this arrangement, early detection of abnormalities is enabled, thereby preventing the compressor 1 from operating in an abnormal condition for a long time, so that prevention of damage to the compressor 1 etc. and, in consequence, improved reliability becomes possible.

Another Modification of the Second Embodiment

Although the second embodiment of the invention has been described, it is apparent that the invention is not limited to the second embodiment, but may be modified into various forms within the scope of the invention.

For instance, while the rotor 1$a$ having a magnet-embedded structure such as shown in FIG. 14 is employed, it may be replaced with a rotor of a magnet-surface structure in which permanent magnets are attached to the rotor surface.

Additionally, the compressor 1 is not limited to the scroll-type, and there may be used other types of compressors such as the swing-type.

Furthermore, the actual temperature to which the estimated temperature is compared in the calibration means 36 is not limited to the temperature of the discharge pipe, and temperature, which is substantially the same as or proportional to the actual internal temperature of the compressor, may be employed.

While the air conditioner shown in FIG. 12 is used as the refrigerator, the invention is equally applicable to other types of refrigerators, as far as they have the compressor 1 equipped with the brushless DC motor 6 capable of temperature estimation.

In addition, a fixed coordinate system may be used as the model for motor temperature estimation in place of the rotary coordinate system model.

INDUSTRIAL APPLICABILITY

As described earlier, the drive unit for a compressor and the refrigerator according to the invention are well suited for use in refrigeration etc. and particularly useful for control performed based on the internal condition of a compressor.

What is claimed is:

1. A refrigerator comprising:
a refrigerant circuit provided with a compressor including a motor and a refrigerant detecting means for detecting a refrigerant state;
a detecting component configured and arranged to detect at least one of a current of said motor and a voltage of said motor; and
a prediction component configured and arranged to predict an internal condition of the compressor based on detection values obtained by said detecting component,
said prediction component having an identification component for identifying a parameter of a motor model from the detection values obtained by the detecting component, and a derivation component for deriving the internal condition of the compressor based on the parameter identified by the identification component, the parameter identified by said identification component being motor driving torque, and
said derivation component being configured to derive the high refrigerant pressure or low refrigerant pressure of the refrigerant circuit based on the motor driving torque identified by the identification component and the refrigerant state detected by the refrigerant detecting component.

2. A refrigerator comprising:
a refrigerant circuit provided with a compressor including a motor and a refrigerant detecting component for detecting a refrigerant state;
a detecting component configured and arranged to detect at least one of a current of said motor and a voltage of said motor; and
a prediction component configured and arranged to predict an internal condition of the compressor based on detection values obtained by said detecting component,
said prediction component having an identification component for identifying a parameter of a motor model from the detection values obtained by the detecting component, and a derivation component for deriving the internal condition of the compressor based on the parameter identified by the identification component, the parameter identified by said identification component being motor driving torque, and
the derivation means being formed such that the relationship between motor driving torque corresponding to at least one of a refrigerant temperature and a refrigerant pressure of the refrigerant circuit and the degree of suction superheat of the compressor is set beforehand and such that the degree of suction superheat of the compressor is derived based on the motor driving torque identified by the identification means and the refrigerant state detected by the refrigerant detecting component.

3. A refrigerator comprising:
a refrigerant circuit provided with a compressor including a motor and equipped with a refrigerant detecting component for detecting a refrigerant state;
a detecting component configured and arranged to detect at least one of a current of said motor and a voltage of said motor; and
a prediction component configured and arranged to predict an internal condition of the compressor based on detection values obtained by said detecting component;
said prediction component having an identification component for identifying a parameter of a motor model from the detection values obtained by the detecting component, and a derivation component for deriving the internal condition of the compressor based on the parameter identified by the identification component, the parameter identified by said identification component being motor driving torque,
the prediction component predicting poor lubrication or liquid compression in the compressor based on an increase in motor driving torque which exceeds a specified value, and the prediction component being formed such that a stationary torque for the motor in its steady state is set based on the motor driving torque identified by the identification component and based on the refrigerant state detected by the refrigerant detecting component and such that the poor lubrication or liquid compression of the compressor is predicted by making a comparison between said stationary torque and the motor driving torque identified by the identification component.

4. A refrigerator comprising:

a refrigerant circuit provided with a compressor including a brushless DC motor;

a detecting component configured and arranged to detect at least one of a current of said motor and a voltage of said motor; and a prediction component configured and arranged to predict an internal condition of the compressor based on detection values obtained by said detecting component, said prediction component having an identification component for identifying a parameter of a motor model from the detection values obtained by the detecting component, and a derivation component for deriving the internal condition of the compressor based on the parameter identified by the identification component, the identification means identifying a parameter based on a motor model constituted by the current and voltage of the motor, resistance and inductance, and the derivation component deriving motor temperature based on the parameter identified by the identification component, the identification component obtaining a motor voltage equation in such a way that a d-axis is plotted in the direction of the N pole of magnets of the motor, a q-axis is plotted in the direction which is shifted forward from the d-axis by $\pi/2$, and a motor basic voltage equation for a three-phase permanent magnet synchronous motor is converted into a d, q axis coordinate system which rotates at an electric angular speed w, and the identification component then identifies a magnetic flux characteristic value associated with an armature flux linkage generated by the magnets, using said motor voltage equation, and the derivation component deriving the temperature of the magnets as motor temperature based on the magnetic flux characteristic value identified by the identification component.

5. The refrigerator according to claim 4, wherein the identification component obtains a voltage equation for a steady state from the motor voltage equation, and at the time of the identification, the d-axis component of the armature current of said steady-state voltage equation is set to zero.

6. A refrigerator comprising:

a refrigerant circuit provided with a compressor including a brushless DC motor;

a detecting component configured and arranged to detect at least one of a current of said motor and a voltage of said motor;

a prediction component configured and arranged to predict an internal condition of the compressor based on detection values obtained by said detecting component:

said prediction component having an identification component for identifying a parameter of a motor model from the detection values obtained by the detecting component, and a derivation component for deriving the internal condition of the compressor based on the parameter identified by the identification component, the identification means identifying a parameter based on a motor model constituted by the current and voltage of the motor, resistance and inductance, and the derivation component deriving motor temperature based on the parameter identified by the identification component, the refrigerant circuit having a refrigerant detecting component for detecting the temperature of a discharge pipe of the compressor, and a calibration component being configured such that the motor temperature derived by the derivation component being regarded as the internal temperature of the compressor, the internal temperature derived by the derivation component is calibrated based on the discharge pipe temperature detected by the temperature detecting component.

* * * * *